United States Patent
Yamada et al.

(10) Patent No.: US 7,231,599 B2
(45) Date of Patent: Jun. 12, 2007

(54) TEMPLATE PRODUCTION SYSTEM, LAYOUT SYSTEM, TEMPLATE PRODUCTION PROGRAM, LAYOUT PROGRAM, LAYOUT TEMPLATE DATA STRUCTURE, TEMPLATE PRODUCTION METHOD, AND LAYOUT METHOD

(75) Inventors: Satoshi Yamada, Suwa (JP); Takashi Nitta, Chino (JP)

(73) Assignee: Seiko Epson Corporation, Tokyo (JP)

( * ) Notice: Subject to any disclaimer, the term of this patent is extended or adjusted under 35 U.S.C. 154(b) by 330 days.

(21) Appl. No.: 10/800,846

(22) Filed: Mar. 16, 2004

(65) Prior Publication Data

US 2004/0255245 A1 Dec. 16, 2004

(30) Foreign Application Priority Data

| Mar. 17, 2003 | (JP) | 2003-072568 |
| Mar. 19, 2003 | (JP) | 2003-076239 |
| Jan. 9, 2004 | (JP) | 2004-004137 |

(51) Int. Cl.
*G06F 15/00* (2006.01)

(52) U.S. Cl. .................. 715/517; 715/500.1; 715/513; 715/530

(58) Field of Classification Search ............. 715/500.1, 715/513, 517, 530
See application file for complete search history.

(56) References Cited

U.S. PATENT DOCUMENTS

| 5,649,216 | A  | * | 7/1997 | Sieber ........................ 715/506 |
| 6,565,610 | B1 | * | 5/2003 | Wang et al. ................. 715/517 |
| 6,684,369 | B1 | * | 1/2004 | Bernardo et al. ............ 715/513 |
| 2003/0121004 | A1 | * | 6/2003 | Christensen et al. ........ 715/513 |
| 2004/0003350 | A1 | * | 1/2004 | Simmons et al. ............ 715/517 |
| 2004/0133560 | A1 | * | 7/2004 | Simske ......................... 707/3 |

FOREIGN PATENT DOCUMENTS

| JP | A 11-96144 | 4/1999 |
| JP | A 2001-312490 | 11/2001 |
| JP | A 2002-82987 | 3/2002 |
| JP | A 2002-83148 | 3/2002 |
| JP | A 2002-123463 | 4/2002 |

(Continued)

OTHER PUBLICATIONS

Microsoft, "Microsoft Word 2000," 1999, Microsoft Corporation, 9.0.6926 SP-3.*
Courter et al, "Mastering Microsoft Office 2000 Professional Edition," 1999, SYBEX Inc, pp. 190-192.*

(Continued)

*Primary Examiner*—Stephen Hong
*Assistant Examiner*—David Faber
(74) *Attorney, Agent, or Firm*—Oliff & Berridge PLC

(57) ABSTRACT

A layout system suitable to produce a wide variety of layout templates using layout samples that may be very different from each other includes a template production device that determines the structure of each of a plurality of layout samples for each layout element and produces a template in which the layout distribution of layout elements and the likelihood of the layout distribution are represented, and a layout device to automatically laying out one or more new layout elements in accordance with the produced template. In this layout system, it is possible to produce layout templates from layout samples even if the layout samples are very different from each other. That is, it is possible to produce a wider variety of layout templates.

7 Claims, 17 Drawing Sheets

FOREIGN PATENT DOCUMENTS

| | | |
|---|---|---|
| JP | A 2002-157238 | 5/2002 |
| JP | A 2002-297570 | 10/2002 |
| JP | A 2002-297571 | 10/2002 |
| JP | A 2002-297572 | 10/2002 |
| JP | A 2002-297573 | 10/2002 |
| JP | A 2003-18394 | 1/2003 |

OTHER PUBLICATIONS

Courter et al, "Mastering Word 97 Fourth Edition," 1997, SYBEX Inc, Fourth Edition, pp. 369-377.*

Castro, "HTML For the World Wide Web, Fifth Edition, with XHTML and CSS: Visual QuickStart Guide"; Sep. 17, 2002, Peachpit Press, 5th Edition, pp. 157-174.*

* cited by examiner

IMPORTANT NOT IMPORTANT

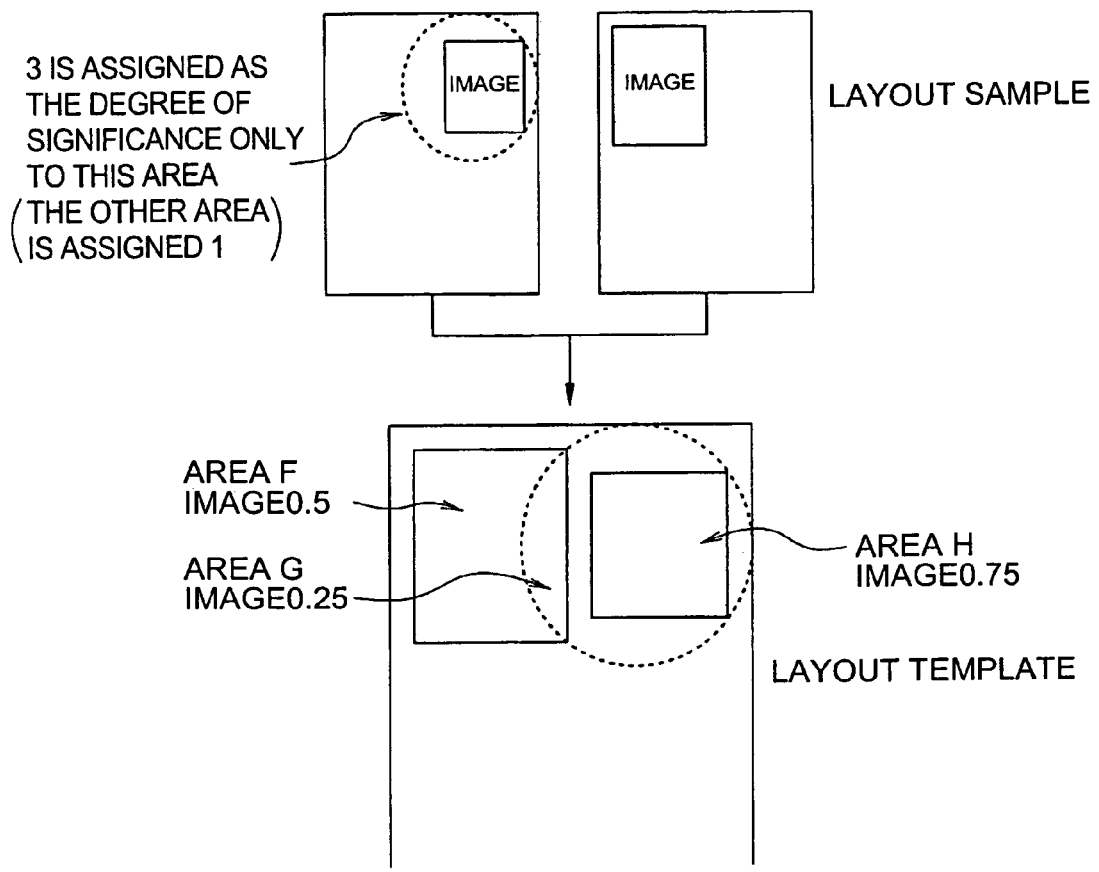

```
<rule-list>                                          → SET OF RULES
  <content-genre>SOCCER</content-genre>              → GENRE OF CONTENTS
  <rule>                                             → RULE
    <value>5</value>                                 → DEGREE OF SIGNIFICANCE
                                                       (WEIGHTING FACTOR)
    <sample-genre>SOCCER</sample-genre>              → GENRE OF SAMPLE
  </rule>
  <rule>
    <value>3</value>
    <sample-genre>SPORTS</sample-genre>
  </rule>
  <rule>
    <value>2<value>
    <sample-keyword>・・・</sample-keyword>           → KEYWORD INCLUDED IN SAMPLE
    <sample-keyword>・・・</sample-keyword>           → KEYWORD INCLUDED IN SAMPLE
         ・
         ・
         ・
  </rule>
<rule-list>
```

FIG.19

TEMPLATE PRODUCTION SYSTEM, LAYOUT SYSTEM, TEMPLATE PRODUCTION PROGRAM, LAYOUT PROGRAM, LAYOUT TEMPLATE DATA STRUCTURE, TEMPLATE PRODUCTION METHOD, AND LAYOUT METHOD

BACKGROUND OF THE INVENTION

1. Field of Invention

The present invention relates to a system, a program, and a method to lay out layout elements, such as text information and/or image information, and more particularly, to a template production system, a layout system, a template production program, a layout program, a layout template data structure, a template production method, and a layout method, suitable to produce a wide variety of layout templates using layout samples that may be very different from each other.

2. Description of Related Art

A digital content distribution system is known in the related art which provides digital contents, such as news contents to users. In such a digital content distribution system, in general, some digital contents are read from a content database (hereinafter, the database will be referred to simply as DB), the read digital contents are edited, and the resultant digital contents are provided to users. In the process of editing the digital contents, the digital contents are automatically laid out into a form that allows users to easily view the digital contents.

A technique of automatically laying out digital contents is disclosed, for example, in Japanese Unexamined Patent Application Publication No. 2001-312490 "Template Automatic Production System and Machine-Readable Storage Medium Including a Program Stored Therein".

In this technique disclosed in Japanese Unexamined Patent Application Publication No. 2001-312490, layout elements (such as text information and image information) laid at the same location are extracted from a plurality of layout samples selected by a user, and a layout template is produced by laying the extracted layout elements in the layout template. Actual layout elements are then laid in accordance with the produced layout template. This method makes it possible to automatically produce a page on which layout elements are laid in a manner desired by the user.

SUMMARY OF THE INVENTION

However, in the first related art technique described above, because a layout template is produced using layout samples in which layout elements are laid at the same location, it is difficult to produce a layout template using layout samples including layout elements laid at different locations. This limits layout samples usable in producing layout templates, and thus it is difficult to produce a wide variety of layout templates.

In view of the above-described problems with the related art technique, the present invention provides a template production system, a layout system, a template production program, a layout program, a layout template data structure, a template production method, and a layout method, suitable to produce a wide variety of layout templates using layout samples that may be very different in layout.

A first aspect of the present invention provides a template production system to produce a layout template using one or more types of layout samples each including at least one or more layout elements laid in a layout frame, the template production device produces the layout template such that a layout distribution of each layout element in the layout frame is registered in connection with corresponding likelihood in the layout template.

In this template production system, it is possible to produce layout templates from layout samples even if the layout samples are very different from each other. That is, it is possible to easily produce a wider variety of layout templates than can be produced using the related art technique.

The template production device may be realized in any fashion as long as the template production device is capable of registering an element-laying area of each layout element in the layout frame in connection with likelihood of each layout element determined over a plurality of layout samples. For example, a likelihood map corresponding to a layout frame is prepared, and likelihood of a layout element is registered in the likelihood map, in a rectangular area corresponding to an element-laying area of that layout element. (This is also true in any of a template production program, a template production method, a layout system, a layout program, a layout method, and data structure, which will be described later.)

The term "likelihood" is used to generically describe "possibility, likelihood, probability", and "probability of occurrence (not only herein but also in any of the template production program, the template production method, the layout system, the layout program, the layout method, and the data structure, which will be described later).

The term "layout" refers to a layout of an image to be displayed on a screen of a CRT (Cathode Ray Tube) or a LCD (Liquid Crystal Display) or a layout of an image to be printed on paper (not only herein but also in any of the template production program, the template production method, the layout system, the layout program, the layout method, and the data structure, which will be described later).

The layout elements include text information whose main part is text, image information whose main part is an image, and other elements that can be laid out (not only herein but also in any of the template production program, the template production method, the layout system, the layout program, the layout method, and the data structure, which will be described later).

The present system may be realized in the form of a single apparatus, a single terminal, or another single device, or in the form of a network system including a plurality of apparatus, terminals, and/or other types of devices connected with each other such that they are capable of communicating with each other. In the latter case, each component may be disposed in any one of the plurality of apparatus or devices, as long as they are connected so as to be communicable with each other.

A second aspect of the present invention provides a template production system according to the first aspect, at least one of the plurality of layout elements assigned a weighting factor, and, for the layout element assigned the weighting factor, the template production device weights the likelihood of the layout element in the plurality of layout samples by the weighting factor, and the template production device registers the layout distribution of the layout element in the layout frame in connection with the weighted likelihood.

By weighting a layout element in layout samples in the above-described manner, it is possible to distinguish important layout samples from less important layout samples. This makes it possible to easily produce a layout template in a manner desired by a user or a designer.

A third aspect of the present invention provides a template production program to cause a computer to execute a process to realize a template production device to produce a layout template using one or more types of layout samples each including at least one or more layout elements laid in a layout frame, the template production device producing the layout template such that a layout distribution of each layout element in the layout frame is registered in connection with corresponding likelihood in the layout template.

This template production program makes it possible to achieve similar advantages to those achieved in the first aspect, by running software on a computer system (hardware), such as a personal computer (PC). This allows a layout template to be produced more easily and more inexpensively than can be produced by a dedicated apparatus. Furthermore, it is possible to easily enhance (upgrade) the functions by modifying the program.

A fourth aspect of the present invention provides a template production program according to the first aspect, at least one of the plurality of layout elements assigned a weighting factor, and, for the layout element assigned the weighting factor, the template production device weights the likelihood of the layout element in the plurality of layout samples by the weighting factor, and the template production device registers the layout distribution of the layout element in the layout frame in connection with the weighted likelihood.

By using this template production program according to the fourth aspect, it is possible to achieve advantages similar to those achieved in the second aspect, and it is possible to produce a layout template easily and inexpensively as is possible in the third aspect.

A fifth aspect of the present invention provides a template production method including selecting one or more types of layout samples each including at least one or more layout elements laid in a layout frame, determining the structure of each selected layout sample for each layout element, and producing a layout template in which the layout distribution of each layout element in the layout frame is registered in connection with corresponding likelihood in accordance with the structure of each layout element.

In this template production system in this aspect, as with that of the first aspect, it is possible to produce a layout template from layout samples even if the layout samples are very different from each other. That is, it is possible to easily produce a wider variety of layout templates than can be produced using the related art technique.

A sixth aspect of the present invention provides a template production method according to the first aspect, at least one of the plurality of layout elements is assigned a weighting factor, and, for the layout element assigned the weighting factor, the likelihood of the layout element in the plurality of layout samples is weighted by the weighting factor, and the layout distribution of the layout element in the layout frame is registered in connection with the weighted likelihood.

In this aspect, as in the second aspect, it is possible to distinguish important layout samples from less important layout samples. This makes it possible to easily produce a layout template in a manner desired by a user or a designer.

A seventh aspect of the present invention provides a layout system including a template production device to determine the structure of one or more types of layout samples each including at least one or more layout elements laid in a layout frame, for each layout element, and producing a layout template in which a layout distribution of each layout element in the layout frame is registered in connection with corresponding likelihood, and a layout device to lay one or more new layout elements in the layout frame in accordance with the layout template produced by the template production device.

By employing the above-described configuration, it becomes possible to produce a layout template in which not only similar layout samples but also layout samples that are very different from each other are reflected. Use of such a layout template makes it possible to obtain a well-balanced and very novel layout.

An eighth aspect of the present invention provides a layout system according to the seventh aspect, when the layout device creates a layout by laying one or more new layout elements in the layout frame of the layout template, the layout device lays the one or more new layout elements in accordance with the likelihood of each element-laying area for each layout element registered in the layout template.

By laying layout elements in accordance with the likelihood of each element-laying area for each layout element registered in the layout template, it is possible to obtain a very novel and desirable layout in which tendency of layouts of layout samples is well reflected.

A ninth aspect of the present invention provides a layout system according to an eighth aspect, when the likelihood is equal for two or more element-laying areas of each layout element, the layout device creates the layout by laying each of the one or more new layout elements in accordance with priority assigned to the two or more element-laying areas.

By laying respective layout elements in accordance with priority assigned to respective element-laying areas, it is possible to reduce the likelihood or prevent two layout elements from being laid in the same element-laying area in a partially or fully overlapping fashion, even if the two layout elements accidentally have the same likelihood for that element-laying area.

A tenth aspect of the present invention provides a layout system according to the seventh aspect, the layout device lays the one or more new layout elements by performing the process including the dividing the layout template into a plurality of cells, calculating, for each cell, the mean values of vertical and horizontal lengths of each layout element that contains the cell and also calculates the likelihood of each layout element, calculating the sum of likelihood of all cells included in an element-laying area placed so as to extend, from a cell taken as an extension start point, in a vertical direction by a length equal to the calculated mean vertical length and in a horizontal direction by a length equal to the calculated mean horizontal length, for each possible location of the extension start point, and selecting an extension start point that results in a greatest sum of likelihood and laying a corresponding new layout element in the element-laying area extending from the selected extension start point.

In this layout system, it is possible to properly determine the size and the location of a layout element even when the size of the layout element is not given.

An eleventh aspect of the present invention provides a layout system according to a tenth aspect, the layout device employing the area or the aspect ratio of each layout element instead of or in addition to the mean values, assigned to each cell, of vertical and horizontal lengths of each layout element.

In the layout system in the eleventh aspect, the area or the aspect ratio of each layout element is employed instead of or in addition to the mean values of vertical and horizontal lengths of layout elements, thereby achieving advantages similar to the advantages achieved in the tenth aspect.

A twelfth aspect of the present invention provides a layout system according to a seventh aspect, the layout elements being classified into image information whose main part is an image and text information whose main part is text, when the template production device setting the layout distribution and the likelihood of a layout element of text information, the template production device also setting information indicating a font type and a font size of the text information, and when the layout device lays the layout element of text information in a particular element-laying area, the layout device determines the font type and the font size of the layout element in accordance with the information indicating the font type and the font size assigned to the element-laying area.

In this layout system, it is possible to obtain a layout in which not only the types of respective layout elements, such as image information or text information are specified, but also a font type and a font size are specified for text information.

A thirteenth aspect of the present invention provides a layout system according to a seventh aspect, at least one of the plurality of layout elements being assigned a weighting factor, and for the layout element assigned the weighting factor, the template production device weights the likelihood of the layout element in the plurality of layout samples by the weighting factor, and the template production device registers, in the layout template, the element-laying area of the layout element in the layout frame in connection with the weighted likelihood.

By weighting respective layout elements in the above-described manner, it is possible to produce a layout template in which layout elements regarded as important by a user or a designer are distinguished from less important layout elements. Thus it is possible to obtain a layout in which not only statistical values of layout samples but also intension of the user or the designer is reflected.

A fourteenth aspect of the present invention provides a layout system according to a seventh aspect, a weighting factor being assigned to each layout sample as a whole, and the template production device weights the likelihood of each layout element in each layout sample by the weighting factor assigned to each layout sample in which the layout element is included, and the template production device registers, in the layout template, the element-laying area of the layout element in the layout frame in connection with the weighted likelihood.

In this layout system, unlike the layout system in the thirteenth aspect in which layout elements are weighted, layout samples are weighted.

In this layout system, it is possible to produce a layout template in which layout samples regarded as important by a user or a designer are distinguished from less important layout samples. Thus it is possible to obtain a layout in which not only statistical values of layout samples but also intension of the user or the designer is reflected.

A fifteenth aspect of the present invention provides a layout system according to one of the seventh through fourteenth aspects, for an element-laying area in which two or more layout elements overlap, the template production device calculates the sums of likelihood of those two or more layout elements over the plurality of layout samples and registers, in the layout template, the calculated sums of likelihood in connection with the element-laying area.

In this layout system, registration of likelihood for an element-laying area in which two or more layout elements overlap can be performed in an efficient manner simply by calculating the sum of likelihood.

A sixteenth aspect of the present invention provides a layout program that causes a computer to function as a template production device to determine the structure of one or more types of layout samples each including at least one or more layout elements laid in a layout frame, for each layout element, and producing a layout template in which a layout distribution of each layout element in the layout frame is registered in connection with corresponding likelihood, and a layout device to lay one or more new layout elements in the layout frame in accordance with the layout template produced by the template production device.

This layout program makes it possible to produce a layout template in which not only similar layout samples but also layout samples that are very different from each other are reflected, as can be in the seventh aspect. Use of such a layout template makes it possible to obtain a well-balanced and very novel layout.

This layout program makes it possible to produce a layout template by running software on a computer system (hardware), such as a personal computer (PC). That is, it is possible to produce a layout template more easily and more inexpensively than can be produced by a dedicated apparatus. Furthermore, it is possible to easily enhance (upgrade) the functions by modifying the program.

A seventeenth aspect of the present invention provides a layout program according to the sixteenth aspect, when the layout device creates a layout by laying one or more new layout elements in the layout frame of the layout template, the layout device lays the one or more new layout elements in accordance with the likelihood of each element-laying area for each layout element registered in the layout template.

In this seventeenth aspect as in the eighth aspect, it is possible to obtain a desirable layout in which tendency of layouts of layout samples is well reflected. Furthermore, in this seventeenth aspect, as in the sixteenth aspect, the functions can be realized on software using a computer system (hardware).

An eighteenth aspect of the present invention provides a layout program according to the seventeenth aspect, when the likelihood is equal for two or more element-laying areas of each layout element, the layout device creates the layout by laying each of the one or more new layout elements in accordance with priority assigned to the two or more element-laying areas.

By employing the layout program according to the eighteenth aspect, it is possible to reduce the likelihood or prevent two layout elements from being laid in the same element-laying area in a partially or fully overlapping fashion, even if the two layout elements accidentally have the same probability for that element-laying area, as can be achieved in the ninth aspect. Furthermore, in this eighteenth aspect, as in the sixteenth aspect, the functions can be realized on software using a computer system (hardware).

A nineteenth aspect of the present invention provides a layout program according to the sixteenth aspect, the layout device laying the one or more new layout elements by performing the process including dividing the layout template into a plurality of cells, calculating, for each cell, the mean values of vertical and horizontal lengths of each layout element that contains the cell and also calculates the likelihood of each layout element, calculating the sum of likelihood of all cells included in an element-laying area placed so as to extend from a cell taken as an extension start point, for each possible location of the extension start point, and selecting an extension start point that results in a greatest sum of likelihood and laying a corresponding new layout element in the element-laying area extending from the selected extension start point.

By employing this layout program, it is possible to properly determine the size and the location of a layout element even when the size of the layout element is not given, as is possible in the tenth aspect. Furthermore, in this nineteenth aspect, as in the sixteenth aspect, the functions can be realized on software using a computer system (hardware).

A twentieth aspect of the present invention provides a layout program according to a sixteenth aspect, the layout device employing the area or the aspect ratio of each layout element instead of or in addition to the mean values, assigned to each cell, of vertical and horizontal lengths of each layout element.

In the twentieth aspect, as in the eleventh aspect, the area or the aspect ratio of each layout element is employed instead of or in addition to the mean values of vertical and horizontal lengths of layout elements, thereby achieving advantages similar to the advantages achieved in the tenth aspect. Furthermore, in this twentieth aspect, as in the sixteenth aspect, the functions can be realized on software using a computer system (hardware).

A twenty first aspect of the present invention provides a layout program according to the sixteenth aspect, the layout elements being classified into image information whose main part is an image and text information whose main part is text, when the template production device sets the layout distribution and the likelihood of a layout element of text information, the template production device also setting information indicating a font type and a font size of the text information, and when the layout device lays the layout element of text information in a particular element-laying area, the layout device determines the font type and the font size of the layout element in accordance with the information indicating the font type and the font size assigned to the element-laying area.

In this twenty first aspect, as in the twelfth aspect, it is possible to obtain a layout in which not only the types of respective layout elements, such as image information or text information are specified, but further details, such as a font type and a font size, are also specified for text information. Furthermore, in this twenty first aspect, as in the sixteenth aspect, the functions can be realized on software using a computer system (hardware).

A twenty second aspect of the present invention provides a layout program according to the sixteenth aspect, at least one of the plurality of layout elements being assigned a weighting factor, and for the layout element assigned the weighting factor, the template production means weights the likelihood of the layout element in the plurality of layout samples by the weighting factor, and the element-laying area of the layout element in the layout frame is registered in connection with the weighted likelihood in the layout template.

In this twenty second aspect, as in the thirteenth aspect, it is possible to produce a layout template in which layout elements regarded as important by a user or a designer are distinguished from less important layout elements. Thus it is possible to obtain a layout in which not only statistical values of layout samples but also intension of the user or the designer is reflected. Furthermore, in this twenty second aspect, as in the sixteenth aspect, the functions can be realized on software using a computer system (hardware).

A twenty third aspect of the present invention provides a layout program according to the sixteenth aspect, a weighting factor being assigned to each layout sample as a whole, and the template production means weights the likelihood of each layout element in each layout sample by the weighting factor assigned to each layout sample in which the layout element is included, and the template production device registers, in the layout template, the element-laying area of the layout element in the layout frame in connection with the weighted likelihood.

In this twenty third aspect, as in the fourteenth aspect, it is possible to produce a layout template in which layout samples regarded as important by a user or a designer are distinguished from less important layout samples. Thus it is possible to obtain a layout in which not only statistical values of layout samples but also intension of the user or the designer is reflected. Furthermore, in this twenty third aspect, as in the sixteenth aspect, the functions can be realized on software using a computer system (hardware).

A twenty fourth aspect of the present invention provides a layout program according to one of the sixteenth through twenty third aspects, for an element-laying area in which two or more layout elements overlap, the template production device calculates the sums of likelihood of those two or more layout elements over the plurality of layout samples and registers, in the layout template, the calculated sums of likelihood in connection with the element-laying area.

In this twenty fourth aspect, as in the fifteenth aspect, registration of likelihood for an element-laying area in which two or more layout elements overlap can be performed in an efficient manner simply by calculating the sum of likelihood.

A twenty fifth aspect of the present invention provides a layout method including determining the structure of one or more types of layout samples, each including at least one or more layout elements laid in a layout frame, for each layout element, producing a layout template in which a layout distribution of each layout element in the layout frame is registered in connection with corresponding likelihood, and laying one or more new layout elements in the layout frame in accordance with the produced layout template.

This layout program makes it possible to produce a layout template in which not only similar layout samples but also layout samples that are very different from each other are reflected, as can be in the seventh aspect. Use of such a layout template makes it possible to obtain a well-balanced and very novel layout.

A twenty sixth aspect of the present invention provides a layout method according to the twenty fifth aspect, when a layout is created by laying one or more new layout elements in the layout frame of the layout template, the one or more new layout elements are laid in accordance with the likelihood of each element-laying area for each layout element registered in the layout template.

In this twenty sixth aspect, as in the eighth aspect, it is possible to obtain a desirable layout in which tendency of layouts of layout samples is well reflected.

A twenty seventh aspect of the present invention provides a layout method according to a twenty fifth aspect, when the likelihood is equal for two or more element-laying areas of each layout element, the layout is created by laying each of the one or more new layout elements in accordance with priority assigned to the two or more element-laying areas.

By employing the layout method according to the twenty seventh aspect, it is possible to reduce the likelihood or prevent two layout elements from being laid in the same element-laying area in a partially or fully overlapping fashion, even if the two layout elements accidentally have the same probability for that element-laying area, as can be achieved in the ninth aspect.

A twenty eighth aspect of the present invention provides a layout method according to the twenty fifth aspect, the one or more new layout elements are laid by performing the process including the dividing the layout template into a plurality of cells, calculating, for each cell, mean values of vertical and horizontal lengths of each layout element that contains the cell and also calculates the likelihood of each layout element, calculating the sum of likelihood of all cells included in an element-laying area placed so as to extend from a cell taken as an extension start point, for each possible location of the extension start point, and selecting an extension start point that results in a greatest sum of likelihood and laying a corresponding new layout element in the element-laying area extending from the selected extension start point.

By employing this layout method, it is possible to properly determine the size and the location of a layout element even when the size of the layout element is not given, as is possible in the tenth aspect.

A twenty ninth aspect of the present invention provides a layout method according to the twenty eighth aspect, the area or the aspect ratio of each layout element being employed instead of or in addition to the mean values, assigned to each cell, of vertical and horizontal lengths of layout elements.

In the twenty ninth aspect, as in the eleventh aspect, the area or the aspect ratio of each layout element is employed instead of or in addition to the mean values of vertical and horizontal lengths of layout elements, thereby achieving advantages similar to the advantages achieved in the tenth aspect.

A thirtieth aspect of the present invention provides a layout method according to the twenty fifth aspect, the layout elements include image information whose main part is an image and text information whose main part is text, when the layout distribution and the likelihood of a layout element of text information are set, information indicating a font type and a font size of the text information is also set, and when the layout element of text information is laid in a particular element-laying area, the font type and the font size of the layout element are determined in accordance with the information indicating the font type and the font size assigned to the element-laying area.

In this thirtieth aspect, as in the twelfth aspect, it is possible to obtain a layout in which not only the types of respective layout elements, such as image information or text information are specified, but further details, such as a font type and a font size, are also specified for text information.

A thirty first aspect of the present invention provides a layout method according to the twenty fifth aspect, at least one of the plurality of layout elements being assigned a weighting factor, and wherein, for the layout element assigned the weighting factor, the likelihood of the layout element in the plurality of layout samples is weighted by the weighting factor, and the element-laying area of the layout element in the layout frame is registered in connection with the weighted likelihood in the layout template.

In this thirty first aspect, as the thirteenth aspect, it is possible to produce a layout template in which layout elements regarded as important by a user or a designer are distinguished from less important layout elements. Thus it is possible to obtain a layout in which not only statistical values of layout samples but also intension of the user or the designer is reflected.

A thirty second aspect of the present invention provides a layout method according to the twenty fifth aspect, a weighting factor is assigned to each layout sample as a whole, and the template production device weights the likelihood of each layout element in each layout sample by the weighting factor assigned to each layout sample in which the layout element is included, and the template production device registers, in the layout template, the element-laying area of the layout element in the layout frame in connection with the weighted likelihood.

In this thirty second aspect, as in the fourteenth aspect, it is possible to produce a layout template in which layout samples regarded as important by a user or a designer are distinguished from less important layout samples. Thus it is possible to obtain a layout in which not only statistical values of layout samples but also intension of the user or the designer is reflected.

A thirty third aspect of the present invention provides a layout method according to one of the twenty fifth through thirty second aspects, for an element-laying area in which two or more layout elements overlap, the template production device calculates the sums of likelihood of those two or more layout elements over the plurality of layout samples and registers, in the layout template, the calculated sums of likelihood in connection with the element-laying area.

In this thirty third aspect, as in the fifteenth aspect, registration of likelihood for an element-laying area in which two or more layout elements overlap can be performed in an efficient manner simply by calculating the sum of likelihood.

A thirty fourth aspect of the present invention provides a data structure of a layout template for use in creating a layout in accordance with the layout template, the layout template produced by using a plurality of layout samples each including one or more layout elements laid in a predetermined layout frame, such that, for each layout element, an element-laying area of the layout element in the layout frame is registered in connection with likelihood of the layout element in the plurality of layout samples.

The data structure in thirty fourth aspect makes it possible to lay a layout element at a location in a layout template, at which the sum of probability of occurrence of the layout element has a greatest value.

A thirty fifth aspect of the present invention provides a data structure of a layout template according to the thirty fourth aspect, the likelihood of each layout element in the plurality of layout samples determined taking into account a weighting factor assigned to each layout element or a weighting factor assigned to each layout sample.

By employing the data structure in this aspect, it is possible to produce a layout template in which layout elements regarded as important are distinguished from less important layout elements. Thus it is possible to produce a layout in a manner desired by the user or the designer.

A thirty sixth aspect of the present invention provides template production device that determines the structure of each of a plurality of layout samples for each layout element and produces a template in which the layout distribution of layout elements and the probabilities of occurrence thereof are represented.

By employing this template production device, it becomes possible to produce a well-balanced and very novel layout template in which not only similar layout samples but also layout samples that are very different from each other are reflected.

A thirty seventh aspect the present invention provides a layout system including a template production device that determines the structure of each of a plurality of layout samples for each layout element and produces a template in which the layout distribution of layout elements and the probabilities of occurrence thereof are represented, and a layout device to automatically lay out one or more new layout elements in accordance with the template produced by the template production device.

By using this layout system, it is possible to produce a well-balanced and very novel layout in accordance with the template in which not only similar layout samples but also layout samples that are very different from each other are reflected.

A thirty eighth aspect of the present invention provides a layout system according to the thirty seventh aspect, the layout device laying layout elements in order of decreasing probability of occurrence of layout elements.

By using this layout system, it is possible to obtain a desirable layout in which tendency of layouts of layout samples is well reflected.

A thirty ninth aspect of the present invention provides a layout system according to the thirty seventh aspect, the layout device lays each layout element such that when the probability of occurrence of the layout element is equal for two or more element-laying areas, the layout device determines the priority for the two or more element-laying areas and lays the layout element in accordance with the determined priority.

By employing the layout system in the fortieth aspect, it is possible to reduce the likelihood or prevent two layout elements from being laid in the same element-laying area in a partially or fully overlapping fashion, even if the two layout elements have the same probability for that element-laying area.

A fortieth aspect of the present invention provides a layout system including a layout sample selector to select a plurality of layout samples, a layout structure detector to detect the structure of layout elements for each of the selected layout samples, a template generator to, in accordance with the structure of layout elements, produce a template in which the layout distribution of layout elements and the probabilities of occurrence thereof are represented, a layout information generator to produce necessary layout information from the template, a layout information output unit to store the layout information in a layout information file and output the layout information as required, and a layout unit to lay one or more new layout elements in accordance with the layout information output from the layout information output unit or in accordance with the layout information directly supplied from the layout information generator.

In this layout system, layout samples that are very different in layout structure from each other can be used. A layout element can be laid properly via the process including steps from the step of selecting layout samples to the step of laying a new layout element.

A forty first aspect of the present invention provides a layout program to cause a computer to realize a template production device that determines the structure of each of a plurality of layout samples for each layout element and produces a template in which the layout distribution of layout elements and the probabilities of occurrence thereof are represented and a layout device to automatically lay out one or more new layout elements in accordance with the template produced by the template production device.

In this aspect, by executing the program on a general-purpose computer, such as a personal computer, the above-described layout system according to an aspect of the present invention can be easily realized.

A forty second aspect of the present invention provides a layout program to cause a computer to realize a layout sample selection function of selecting a plurality of layout samples, a layout structure detection function of detecting the structure of layout elements for each of the selected layout samples, a template generation function of, in accordance with the structure of layout elements, producing a template in which the layout distribution of layout elements and the probabilities of occurrence thereof are represented, a layout information generation function of producing necessary layout information from the template, a layout information output function of storing the layout information in a layout information file and outputting the layout information as required and a layout function of laying one or more new layout elements in accordance with the layout information.

In the aspect, in addition to achieving advantages similar to those obtained in the forty first aspect, it is possible to properly lay a layout element via the process including steps from the step of selecting layout samples to the step of laying a new layout element.

A forty third aspect of the present invention provides a layout method including selecting a plurality of layout samples, determining the structure of each selected layout sample for each layout element, producing, in accordance with the structure of layout elements, a template in which the layout distribution of layout elements and the probabilities of occurrence thereof are represented, producing necessary layout information from the template, and laying one or more new layout elements in accordance with the layout information.

This layout method makes it possible to properly produce a well-balanced and very novel layout template in which not only similar layout samples but also layout samples that are very different from each other are reflected.

A forty fourth aspect of the present invention provides a layout method including selecting a plurality of layout samples, determining the structure of each selected layout sample for each layout element, producing, in accordance with the structure of layout elements, a template in which the layout distribution of layout elements and the probabilities of occurrence thereof are represented, dividing the template into small cells, calculating, for each cell, the mean values of vertical and horizontal lengths of each element that contains the cell and also calculates the probability of occurrence of each layout element; calculating the sum of probabilities of occurrence of all cells included in an area extending from a cell taken as an extension start point, for each possible location of the extension start point, selecting an extension start point that results in a greatest sum of probabilities of occurrence and laying a corresponding new layout element in the element-laying area extending from the selected extension start point.

In this layout method, it is possible to properly determine the size and the location of a layout element even when the size of the layout element is not given.

A forty fifth aspect of the present invention provides a layout method according to the forty fourth aspect, the area or the aspect ratio of each layout element is employed instead of the mean values, assigned to each cell, of vertical and horizontal lengths of layout elements.

In this aspect, the area or the aspect ratio of each layout element is employed instead of the mean value of vertical and horizontal lengths of layout elements, thereby achieving advantages similar to those obtained in the eighth aspect.

A forty fifth aspect of the present invention provides a layout method including selecting a plurality of layout samples, determining the structure of each selected layout sample, for each of an image part, a text part, and a font type and a font size of the text part, producing, in accordance with the structure of layout elements, a template in which the layout distribution of layout elements and the probabilities of occurrence thereof are represented, laying an image in accordance with the probability of occurrence described in the template, and laying text with a font type and a font size having high probabilities in the remaining area.

In this layout method, it is possible to obtain a layout in which not only the types of respective layout elements, such as an image layout element or a text layout element, are specified, but also further details, such as a font type and a font size, are specified for each text layout element.

A forty seventh aspect of the present invention provides a template production system including a template production device to produce a layout template using a plurality of layout samples each including layout elements laid in a predetermined layout frame, such that for each layout element, the layout distribution of the layout element in the layout frame registered in connection with the probability of occurrence of the layout element in the plurality of layout samples, at least one of the plurality of layout elements assigned a weighting factor, and, for the layout element assigned the weighting factor, the template production device weights the probability of occurrence of the layout element in the plurality of layout samples by the weighting factor, and the template production device registers the layout distribution of the layout element in the layout frame in connection with the weighted likelihood.

In this template production system, a layout template is produced by the template production device in accordance with a plurality of layout samples. In the layout template, for each layout element, the layout distribution of the layout element in the layout frame is registered in connection with the probability of occurrence of the layout element in the plurality of layout samples. For the layout element assigned a weighting factor, the probability of occurrence of the layout element in the plurality of layout samples is weighted by the weighting facto. The layout distribution of the layout element in the layout frame is registered in connection with the weighted probability of occurrence. In accordance with the produced layout template, a layout element can be laid at a location in the layout template at which the sum of probabilities of occurrence of the layout element has a greatest value.

In this template production system, it is possible to produce layout templates from layout samples even if the layout samples are very different from each other. That is, it is possible to produce a wider variety of layout templates than can be produced using the related art technique. By weighting layout elements in layout samples in the above-described manner, it is possible to produce a layout template in which important layout samples are distinguished from less important layout samples. This makes it possible to easily produce layout templates in a manner desired by a user or a designer.

A forty eighth aspect of the present invention provides a layout system including a template production device to produce a layout template using a plurality of layout samples each including layout elements laid in a predetermined layout frame, and a layout device to lay one or more layout elements using the layout template produced by the template production device, the template production device producing the layout template such that, for each layout element, the layout distribution of the layout element in the layout frame is registered in the layout template in connection with the probability of occurrence of the layout element in the plurality of layout samples, at least one of the plurality of layout elements is assigned a weighting factor, and for the layout element assigned the weighting factor, the template production device weights the probability of occurrence of the layout element in the plurality of layout samples by the weighting factor. The template production device registers the layout distribution of the layout element in the layout frame in connection with the weighted likelihood.

In this layout system, a layout template is produced by the template production device in accordance with a plurality of layout samples. In the layout template, for each layout element, a layout distribution of the layout element in the layout frame is registered in connection with a probability of occurrence of the layout element in the plurality of layout samples. For the layout element assigned a weighting factor, the probability of occurrence of the layout element in the plurality of layout samples is weighted by the weighting factor, and the layout distribution of the layout element in the layout frame is registered in connection with the weighted probability of occurrence. A new layout element is then laid by the layout device in accordance with the produced layout template.

In this template production system, it is possible to produce layout templates from layout samples even if the layout samples are very different from each other. This makes it possible to produce a wider variety of layout templates than can be produced using the related art technique. By weighting layout elements in layout samples in the above-described manner, it is possible to produce a layout template in which important layout samples are distinguished from less important layout samples. This makes it possible to produce layout templates in a manner desired by a user or a designer. That is, it is possible to realize a wide variety of layout templates in a manner desired by a user or a designer.

The layout device may be in any form as long as it can lay layout elements in accordance with the layout template. For example, the layout device may lay a layout element at a location in the layout template at which the sum of probabilities of occurrence of the layout element has an Nth-greatest value (N being an integer).

A forth ninth aspect of the present invention provides a layout system according to forty eighth aspect, a weighting factor assigned to each layout sample as a whole, and the template production device weights the probability of occurrence of each layout element in each layout sample by the weighting factor assigned to each layout sample in which the layout element is included, and the template production device registers the layout distribution of the layout element in the layout frame in connection with the weighted likelihood.

In this layout system, by the template production device, the probability of occurrence of each layout element in each layout sample is weighted by the weighting factor assigned to each layout sample in which the layout element is included and the layout distribution of the layout element in the layout frame is registered in connection with the weighted probability of occurrence.

Thus, weighting each layout sample causes all layout elements in the layout sample to be weighed by the same factor. This makes it easier to assign weighting factors to layout elements.

A fiftieth aspect of the present invention provides a layout system according to the forty eighth or forty ninth aspect, the template production device relates the element-laying area of each element in the layout frame to the probability of occurrence of the layout element in the plurality of layout samples.

In this layout system, by the template production device, the element-laying area of each element in the layout frame is related to the probability of occurrence of the layout element in the plurality of layout samples.

Furthermore, in this layout system, a layout element can be laid at a location in the layout template at which the sum of probabilities of occurrence of the layout element has a greatest value.

A fifty first aspect of the present invention provides a layout system according to the forty ninth aspect, for an element-laying area in which two or more layout elements overlap, the template production device determines the values assigned to that element-laying area taking into account the probability of occurrences of the layout elements in the plurality of layout samples.

In this layout system, for an element-laying area in which two or more layout elements overlap, the template production device determines the values for that element-laying area taking into account the probability of occurrences of the layout elements in the plurality of layout samples and assigns the determined values to the element-laying area.

In this layout system, registration of likelihood for an element-laying area in which two or more layout elements overlap, can be performed in an efficient manner simply by registering values determined by taking into the probabilities of occurrence.

A fifty second aspect of the present invention provides a layout system according to the fifty first aspect, including a layout element storage device to store the plurality of layout elements, and layout element selection device to select a layout element from those stored in the layout element storage device, the layout device determines at which location in the layout template the sum of probabilities of occurrence of the layout element has a greatest value and lays the layout element at that location.

In this layout system, the layout element selection device selects a layout element from those stored in the layout element storage device, and the layout device lays the layout element at a location in the layout template at which the sum of probabilities of occurrence of the layout element has a greatest value.

It is possible to properly determine at which location in the layout template a layout element should be laid, and thus it is possible to easily achieve a wide variety of layouts in a manner desired by a user or a designer.

The layout element storage device may be in any form as long as it can store layout elements at an arbitrary manner and time. Layout elements may be stored in advance in the layout element storage device, or may be input from the outside and stored therein when the system is started.

A fifty third aspect of the present invention provides a layout system according to fifty second aspect, a rule of determining weighting factors to be applied to layout elements is defined, and the template production device determines the weighting factor to be applied to the layout element selected by the layout element selection device in accordance with the weighting factor determination rule, and, for layout elements that are included in the layout samples and that are the same as or similar to the layout element selected by the layout element selection device, weights the probability of occurrence of those layout elements in the layout samples by the determined factor.

In this layout system, the template production device determines the weighting factor to be applied to the selected layout element in accordance with the weighting factor determination rule. For layout elements that are included in the layout samples and that are the same as or similar to the selected layout element, the probability of occurrence of those layout elements in the layout samples is weighted by the determined factor.

In this layout system, when a layout template is produced, selected layout elements are weighted depending on the layout elements, and thus it is possible to lay layout elements in a desirable fashion.

A fifty fourth aspect of the present invention provides a layout system according to the fifty second or fifty third aspect, there being defined a rule of determining a location in the layout template at which to lay the layout element, from a plurality of candidates for the location if there are such candidates for the location, and the layout device laying the layout element such that when there are a plurality of candidates for the location at which to lay the layout element selected by the layout element selection device, the layout element is laid at one of the candidates for the location in accordance with the location determination rule.

In this layout system, when there are a plurality of locations at which the sum of probabilities of occurrence associated with a layout element in an element-laying area has equally a greatest value and thus there are a plurality of candidates for the location at which to lay a selected layout element, the layout device lays the layout element at one of the candidates for the location in accordance with the location determination rule.

This makes it possible to reduce the possibility that when there are a plurality of candidates for locations at which to lay layout elements, a plurality of layout elements are laid in a fully or partially overlapping fashion.

A fifty fifth aspect of the present invention provides a template production program to cause a computer to execute a process to realize a template production device to produce a layout template using a plurality of layout samples, each including one or more layout elements laid in a predetermined layout frame, the template production device produces the layout template in which, for each layout element, a layout distribution of the layout element in the layout frame is registered in connection with a probability of occurrence of the layout element in the plurality of layout samples, and at least one of the plurality of layout elements assigned a weighting factor, and, for the layout element assigned the weighting factor, the template production device weights the probability of occurrence of the layout element in the plurality of layout samples by the weighting factor, and the template production device registers the layout distribution of the layout element in the layout frame in connection with the weighted likelihood.

In this aspect, the computer reads the template production program and executes the process in accordance with the program thereby achieving functions and advantages similar to those achieved by the template production system according to the first aspect.

A fifty sixth aspect of the present invention provides a layout program to cause a computer to execute a process to realize a template production device to produce a layout template using a plurality of layout samples, each including layout elements laid in a predetermined layout frame, and a layout device to lay a layout element using the layout template produced by the template production device, the template production device producing the layout template such that, for each layout element, the layout distribution of the layout element in the layout frame is registered in the layout template in connection with the probability of occurrence of the layout element in the plurality of layout samples, at least one of the plurality of layout elements assigned a weighting factor, and for the layout element assigned the weighting factor, the template production device weights the probability of occurrence of the layout element in the plurality of layout samples by the weighting factor, and the template production device registers the layout distribution of the layout element in the layout frame in connection with the weighted likelihood.

In this aspect, the computer reads the template production program and executes the process in accordance with the program thereby achieving functions and advantages similar to those achieved by the layout system in the second aspect.

A fifty seventh aspect of the present invention provides a data structure of a layout template for use in creating a layout in accordance with the layout template, the layout template produced by using a plurality of layout samples, each including one or more layout elements laid in a predetermined layout frame, such that, for each layout element, the layout distribution of the layout element in the layout frame is registered in connection with probability of occurrence of the layout element in the plurality of layout samples.

Use of the data structure in this aspect makes it possible to determine at which location in the layout template the sum of probabilities of occurrence of the layout element has a greatest value, and to lay the layout element at that location.

A fifty eighth aspect of the present invention provides a template production method including producing a layout template using a plurality of layout samples, each including layout elements laid in a predetermined layout frame, such that, for each layout element, a layout distribution of the layout element in the layout frame is registered in the template in connection with a probability of occurrence of the layout element in the plurality of layout samples, the template production method further including assigning at least one of the plurality of layout elements a weighting factor, the template production step including, for the layout element assigned the weighting factor, weighting the probability of occurrence of the layout element in the plurality of layout samples by the weighting factor, and registering the layout distribution of the layout element in the layout frame in connection with the weighted likelihood.

This template production method provides advantages similar to those achieved by the template production system in the forty seventh aspect.

A fifty ninth aspect of the present invention provides a layout method including producing a layout template using a plurality of layout samples, each including layout elements laid in a predetermined layout frame, and laying a layout element using the layout template produced in the template production step, the template production step including, for each layout element, registering a layout distribution of the layout element in the layout frame in the template in connection with a probability of occurrence of the layout element in the plurality of layout samples, the layout method further including assigning at least one of the plurality of layout elements a weighting factor, the template production step including, for the layout element assigned the weighting factor, weighting the probability of occurrence of the layout element in the plurality of layout samples by the weighting factor, and registering the layout distribution of the layout element in the layout frame in connection with the weighted likelihood.

This layout method provides advantages similar to those achieved by the layout system in the forty eighth aspect.

In the layout step, layout elements may be laid in any manner in accordance with a layout template. For example, a layout element may be laid at a location in the layout template at which the sum of probabilities of occurrence of the layout element has an Nth-greatest value (wherein N is an integer).

BRIEF DESCRIPTION OF THE DRAWINGS

FIGS. 17A–17C are schematics illustrating a manner in which a layout template is produced using a plurality of layout samples;

FIG. 19 is a schematic illustrating a data structure of data indicating a degree-of-significance determination rule.

DETAILED DESCRIPTION OF EXEMPLARY EMBODIMENTS

Exemplary embodiments of the invention are described below with reference to the accompanying drawings.

Figure 1:
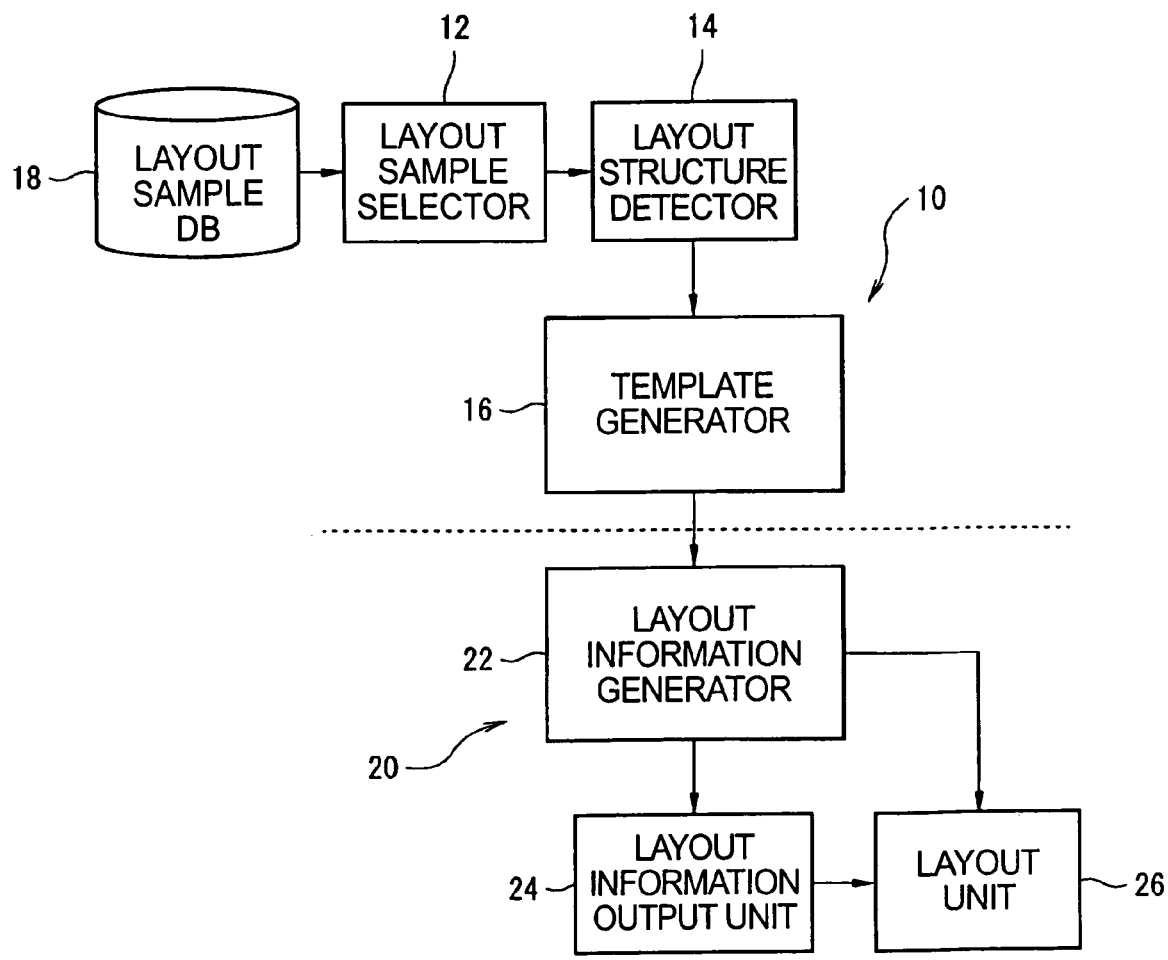
FIG. 1 is a block schematic illustrating the structure of a layout system.

FIG. 1 is a layout system according to a first exemplary embodiment of the present invention.

As shown in FIG. 1, the layout system includes a template production device 10 to generate a layout template representing a layout distribution of elements, such as text information or image information in a layout and also representing likelihood of the layout distribution, and a layout device 20 to lay one or more layout elements using the layout template generated by the template production device 10 thereby creating a new layout.

The template production device 10 includes a layout sample DB 18 in which a plurality of layout samples, each including layout elements laid in a particular layout frame, are stored, a layout sample selector 12 to select a layout sample from the layout sample DB 18, a layout structure detector 14 to detect the structure of layout elements of the layout sample selected by the layout sample selector 12 and a template generator 16 to generate a layout template in accordance with the structure detected by the layout structure detector 14.

In the template production device 10, the layout sample selector 12 selects a plurality of layout samples from the layout sample DB 18 and the layout structure detector 14 detects the structure of layout elements for each layout sample. For example, when a layout sample includes two layout elements, one of which is text information whose main part is a text and the other one is image information whose main part is an image, the layout structure detector 14 determines the size and the shape of respective areas in which text information and image information are laid. Thereafter, in accordance with the resultant detected layout structure, the template generator 16 produces a layout template in which the layout distribution of each layout element is registered in connection with the likelihood of the layout distribution.

The layout device 20 includes a layout information generator 22, a layout information output unit 24, and a layout unit 26. The layout information generator 22 generates new layout information (layout elements) indicating new layout elements to be laid in the layout template. The layout information output unit 24 outputs the generated layout information as a layout information file or sends it to the layout unit 26. The layout unit 26 lays layout elements in the layout frame of the layout template in accordance with the layout information (layout element).

Figure 2:
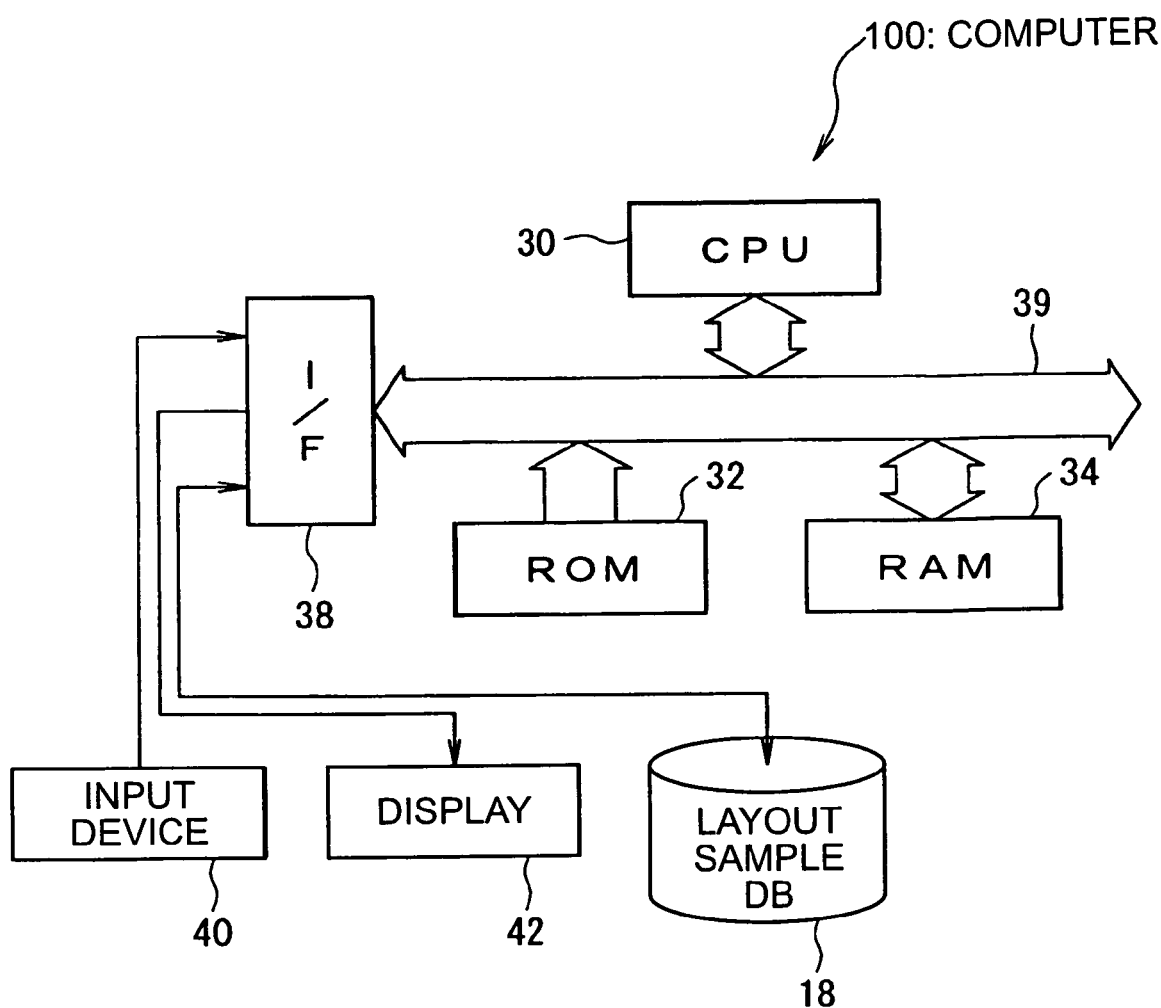
FIG. 2 is a schematic illustrating the structure of a computer for realizing a layout system.

Referring to FIG. 2, a structure of a computer 100 used to realize the layout system according to an aspect of the present invention is described below.

FIG. 2 is a block schematic illustrating the structure of the computer 100.

As shown in FIG. 2, the computer 100 includes a CPU 30 to perform calculations and control the whole of the system in accordance with a control program, a ROM 32 in which the control program to control the CPU 30 is stored in a particular storage area, a RAM 34 to store data read from the ROM 32 and to store data during a calculation performed by the CPU 30, and a I/F 38 via which to input/output data from/to an external apparatus, those parts connected with each other via a bus 39 serving as a signal line to transfer data such that data can be transferred among those parts.

The I/F 38 are connected with external apparatus, including an input unit 40 including a keyboard and a mouse to input data, a display 42 to display a screen in accordance with an image signal, and the layout sample DB 18. The layout sample DB 18 is a read/write external storage device, such as a hard disk. The layout samples stored in the layout sample DB 18 are supplied/updated at scheduled intervals or at arbitrary times as required, in accordance with layout samples supplied from an information source, such as an Internet web site or supplied via an input device (not shown).

Figure 3A:
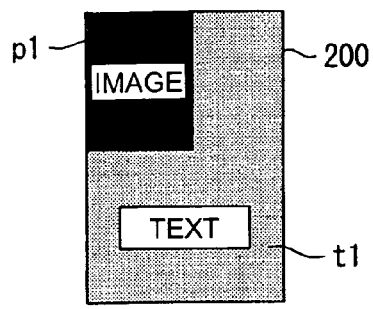
FIGS. 3A–3F are schematics illustrating a first exemplary embodiment of the present invention.
Figure 3B:
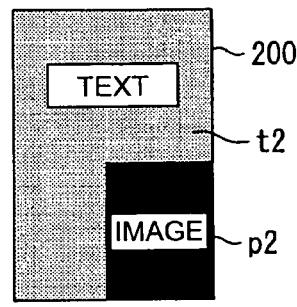
Figure 3C:
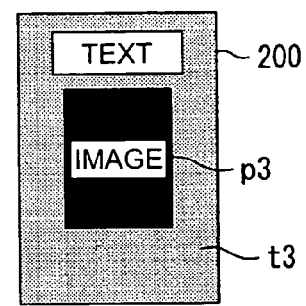
Figure 3D:
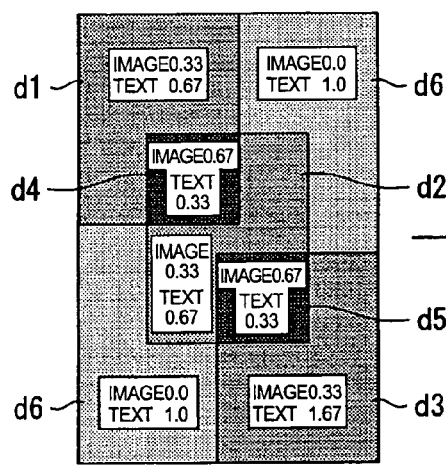
Figure 3E:
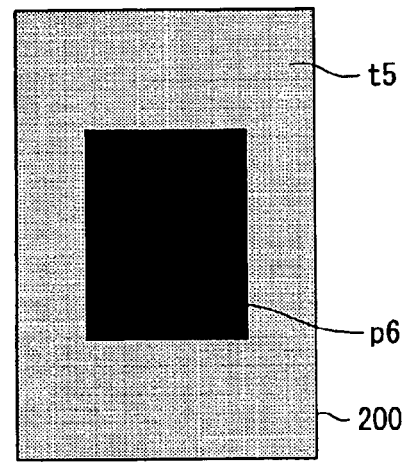
Figure 3F:
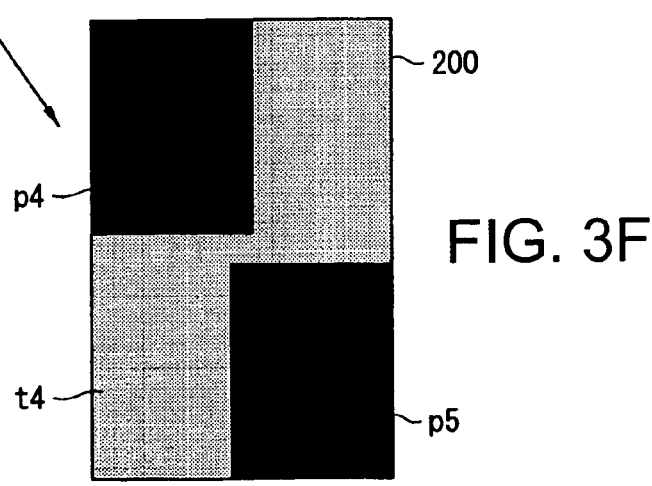
Figure 4:
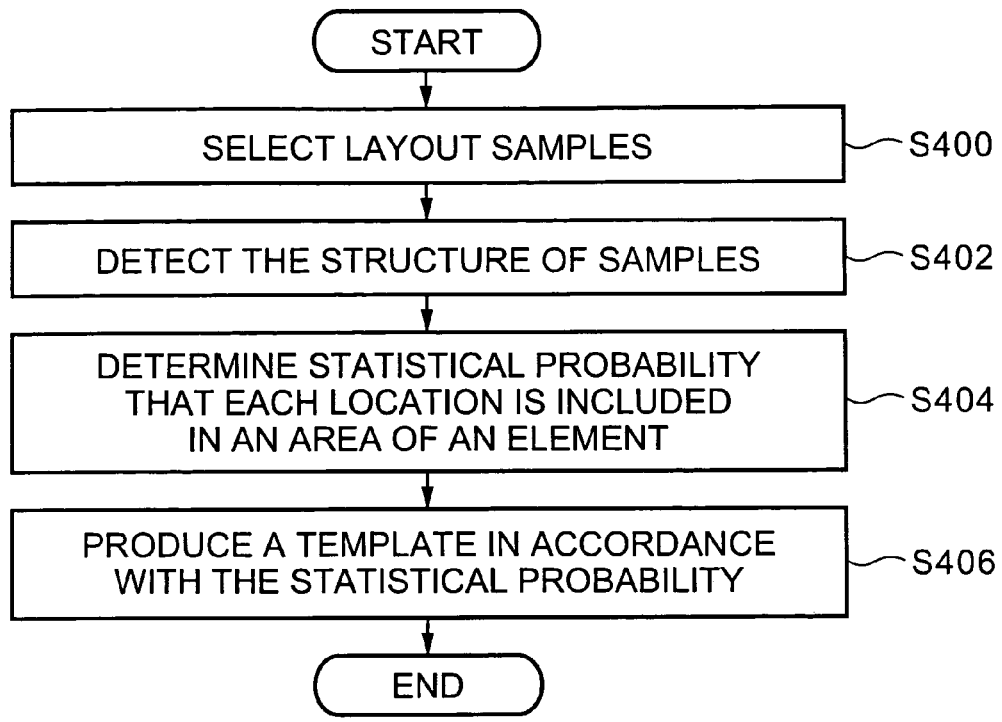
FIG. 4 is a flow chart illustrating a flow until the step of producing a template.

The CPU 30 is a micro processing unit (MPU) or the like, which reads a processing program stored in a particular storage area of the ROM 32 and executes a template generation process and a layout process shown in FIGS. 3 and 4, respectively, by a time-division operation in accordance with the processing program.

Specific exemplary embodiments of the layout system according to an aspect of the present invention are described below.

First, as shown in FIG. 1, in the template production device 10, the layout sample selector 12 selects some layout samples from the layout sample DB 18. The layout structure detector 14 detects the structure of each layout sample and determines whether each point is occupied by image information or text information.

In the present exemplary embodiment, there is no specific limitation on a criterion to select layout samples. For example, layout samples may be selected in accordance with tendency of information technology associated with layout. Alternatively, popular layouts or user's or designer's favorite layouts may be selected. Layout samples may be in the form of electronic layout data or image data captured via an OCR (Optical Character Reader) or the like.

In the present exemplary embodiment, by way of example, it is assumed that layout samples a, b, and c are selected so that one piece of image information and one piece of text information are laid as layout elements in a layout frame 200 of each layout sample, as shown on the upper side of FIG. 3.

In the layout sample a, one piece of image information "p1", with a rectangular shape, is placed in a rectangular area in the upper left corner of the layout frame 200, and text information "t1" is placed in the remaining rectangular area. In the layout sample b, one piece of image information "p2", with a rectangular shape, is placed in a rectangular area in the lower right corner of the layout frame 200, and text information "t2" is placed in the remaining rectangular area. In the layout sample c, one piece of image information "p3", with a rectangular shape, is placed in a central rectangular area of the layout frame 200, and text information "t3" is laid in a rectangular area around the image information "p3".

After detecting the structure of each selected layout sample, the template generator 16 determines a statistical probability for a point in the layout frame 200 to be occupied by a particular layout element on the basis of the layout data, and the template generator 16 generates a layout template indicating the layout distribution and the likelihood of the layout distribution on the basis of the statistical probability.

In this specific example, a layout template D is generated from the selected three layout samples a, b, and c, as shown in FIG. 3D.

That is, in the layout template shown in FIGS. 3A–3F, the entire layout frame 200 is an area in which text information can be laid. In contrast, areas for laying image information are distributed among a rectangular area "d1" in the upper left corner of the layout frame 200, a rectangular area "d3" in the lower right corner of the layout frame 200, and a rectangular area "d2" in the center of the layout frame 200.

The likelihood indicating the probability for image information to be placed in a particular rectangular area in the layout frame 200 is "0.33 (=⅓)" for any of the rectangular area "d1" in the upper left corner of the layout frame 200, the central rectangular area "d2", and the rectangular area "d3" in the lower right corner. In an area "d4" in which the rectangular areas "d1" and "d2" overlap and in an area "d5" in which the rectangular areas "d2" and "d3" overlap, the likelihood is "0.67 (=2/3)", which is twice the likelihood for any non-overlapping rectangular area of the rectangular areas.

In the remaining rectangular areas "d6", there is no distribution of image information, and thus the likelihood that image information is placed in those rectangular areas is "0.0 (=0/3)".

The likelihood that text information is placed in the layout frame 200 is "0.67 (=2/3)" for any of the rectangular area "d1" in the upper left corner of the layout frame 200, the central rectangular area "d2", and the rectangular area "d3" in the lower right corner. In the overlapping rectangular areas "d4" and "d5", the likelihood is "0.33 (=1/3)", which is one-half the likelihood for any non-overlapping rectangular area of the rectangular areas. In the remaining rectangular areas "d6", there is no distribution of image information, and the likelihood that text information is placed in those rectangular areas is "1.0 (=3/3)".

FIG. 4 is a flow chart illustrating a process performed by the template production device 10 to generate a layout template.

First, in step S400, some layout samples are selected from the layout sample DB 18. In the next step S402, the manner in which layout elements are laid is detected for each layout sample. In step S404, a statistical probability that a point in the layout frame 200 is occupied by a particular layout element is determined on the basis of the result obtained in step S402. Thereafter, the process proceeds to step S406 in which a layout template indicating the distribution of each element and the likelihood thereof is produced on the basis of the statistical probability.

In the layout device 20 shown in FIG. 1, after obtaining the layout template indicating the distribution of each element and the likelihood thereof in the manner described above, the layout information generator 22 generates layout information in accordance with the layout template and the number and types of layout elements to be placed. The generated layout information is supplied to the layout unit 26. Upon receiving the layout information, the layout unit 26 lays the layout elements in the layout frame in accordance with the layout information.

Figure 5:
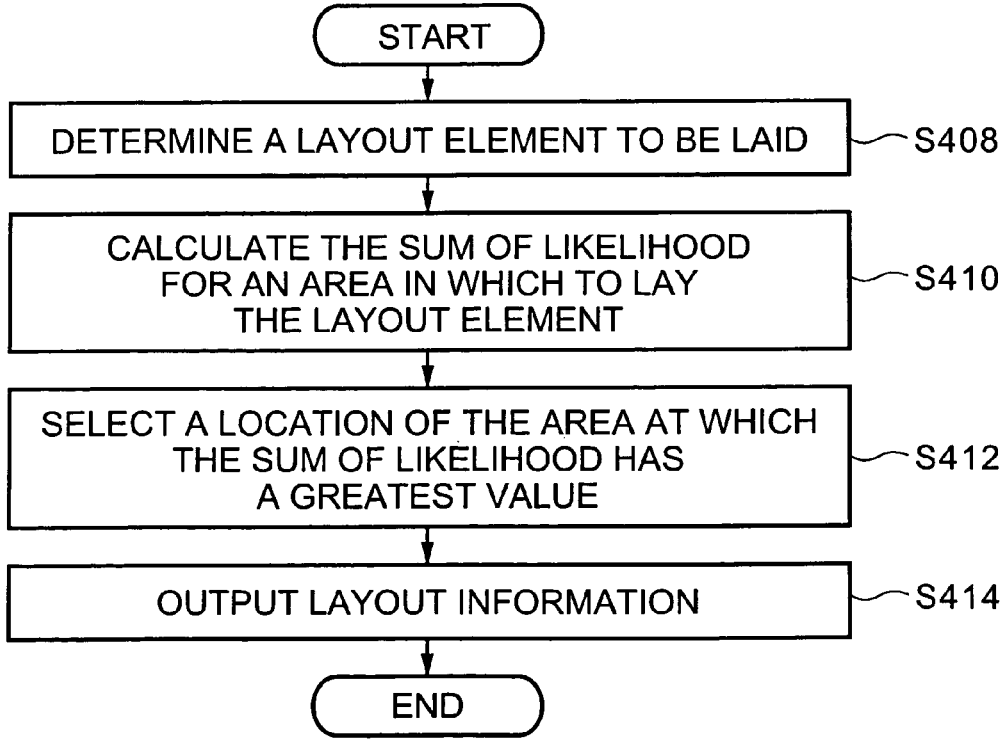
FIG. 5 is a flow chart illustrating a flow until the step of producing layout information.

Specifically, as shown in a flow chart of FIG. 5, first in step S408, the layout device 20 determines the types (sizes, shapes, etc.) of layout elements to be placed and the number of layout elements. In step S410, the sum of likelihood is calculated for each possible element-laying area in the layout template and a location of the element-laying area at which the sum of likelihood has a greatest value is detected. Information indicating above parameters obtained at that location is output as layout information (steps S412 and S414). In accordance with the layout information, actual layout elements are laid in the layout frame.

In the example shown in FIGS. 3A–3D, in a case in which two pieces of image information "p4" and "p5" with a size and a shape equal to those of image information in a layout sample and also text information "t4" are laid by using a layout template, such as that shown in FIG. 3D, in which the element-laying area for each layout element and the likelihood thereof are registered, because the sum of likelihood of image information has a greatest value for a rectangular area "d1" including "d4" and also for a rectangular area "d3" including "d5" in the layout frame 200, the image information "p4" and the image information "p5" are respectively laid in the rectangular areas "d1" and "d3", and the text information "t4" is laid in the remaining area, as shown in FIG. 3F.

In a case in which only one piece of image information "p6" with a size and a shape equal to those of image information in a layout sample is laid using the same layout template as that used in the previous example, because the sum of likelihood of image information has a greatest value for a rectangular area in the center of the layout frame 200, the image information "p6" is laid in this area in the center and the text information "t5" is laid in the remaining area surrounding the area in the center, as shown in FIG. 3F. Note that in this specific case, the resultant layout becomes the same as the layout sample b.

In the present exemplary embodiment, as described above, a layout template, indicating the layout distribution of each layout element and corresponding likelihood, is produced from a plurality of layout samples, and each layout element is laid in accordance with the layout template. This makes it possible to properly lay out layout elements in a manner desired by a user or a designer.

Use of layout samples that are very different in layout structure from each other makes it possible to achieve a well-balanced and very novel layout.

Although in the specific exemplary embodiment described above, image information to be laid is fixed in size and shape, an area in which to lay a layout element may be determined simply by selecting an area that is high in the sum of likelihood, if the size and the shape of the area are not important. Instead of evaluating the sum of likelihood for each area, an area may be selected in accordance with a simple sum of likelihood. The layout information file produced by the layout information generator 22 may be, in addition to being used by the layout unit 26, stored as new data in the layout sample DB 18 for future use as one of layout samples.

A second exemplary embodiment of the present invention is described below with reference to FIGS. 6 and 7. In the second exemplary embodiment, unlike the first exemplary embodiment described above in which a layout element whose size (and shape) is already determined is laid, a layout element whose size (and shape) is not determined is laid in an effective manner.

Figure 6:
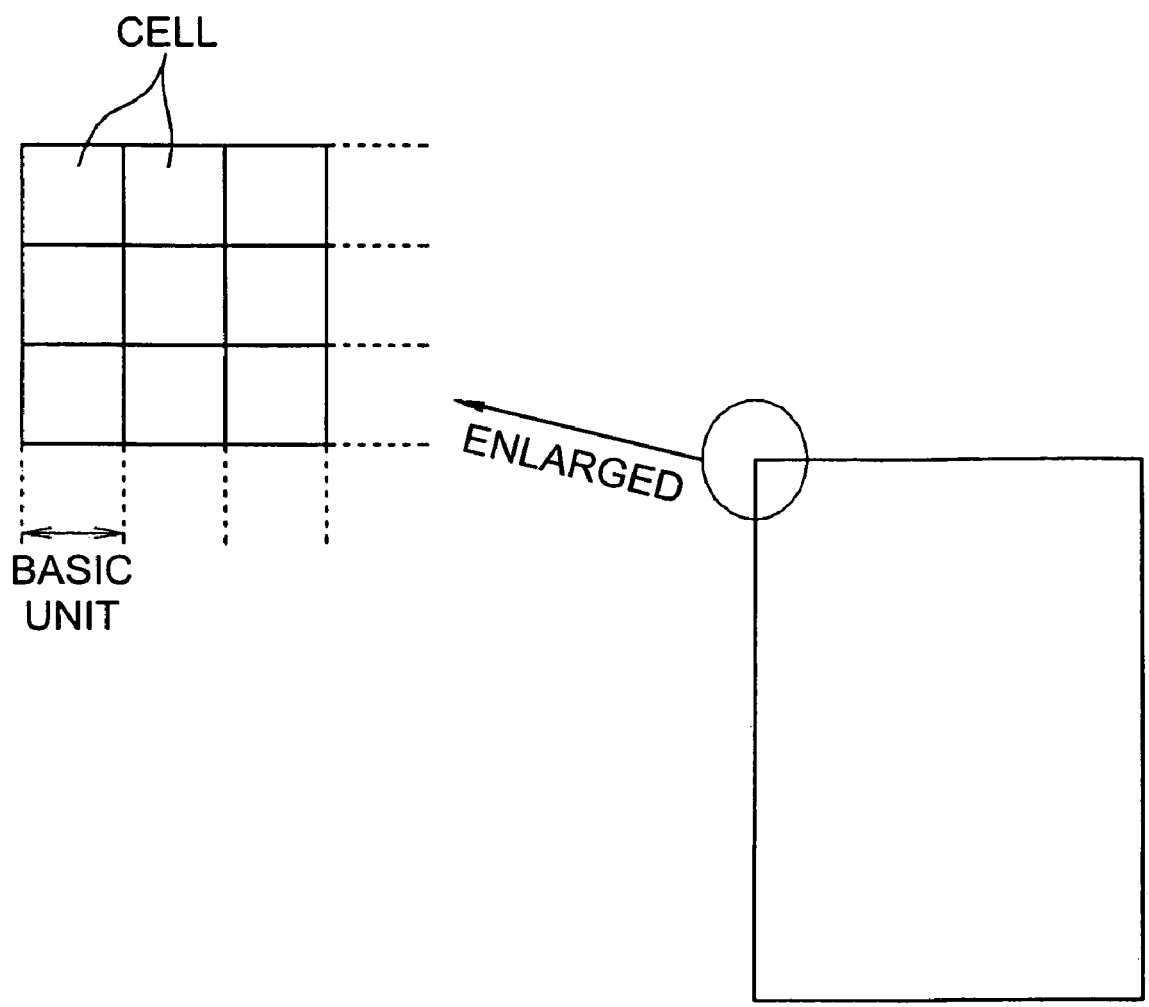
FIG. 6 is a schematic illustrating a second exemplary embodiment of the present invention.

In the present exemplary embodiment, as shown in FIG. 6, a layout sample including layout elements, such as image information and/or text information, is divided vertically and horizontally in units of, for example, 0.1 mm into basic units called "cells", and a layout element is laid with the aid of the cells.

Figures 7A, 7B, 7C:
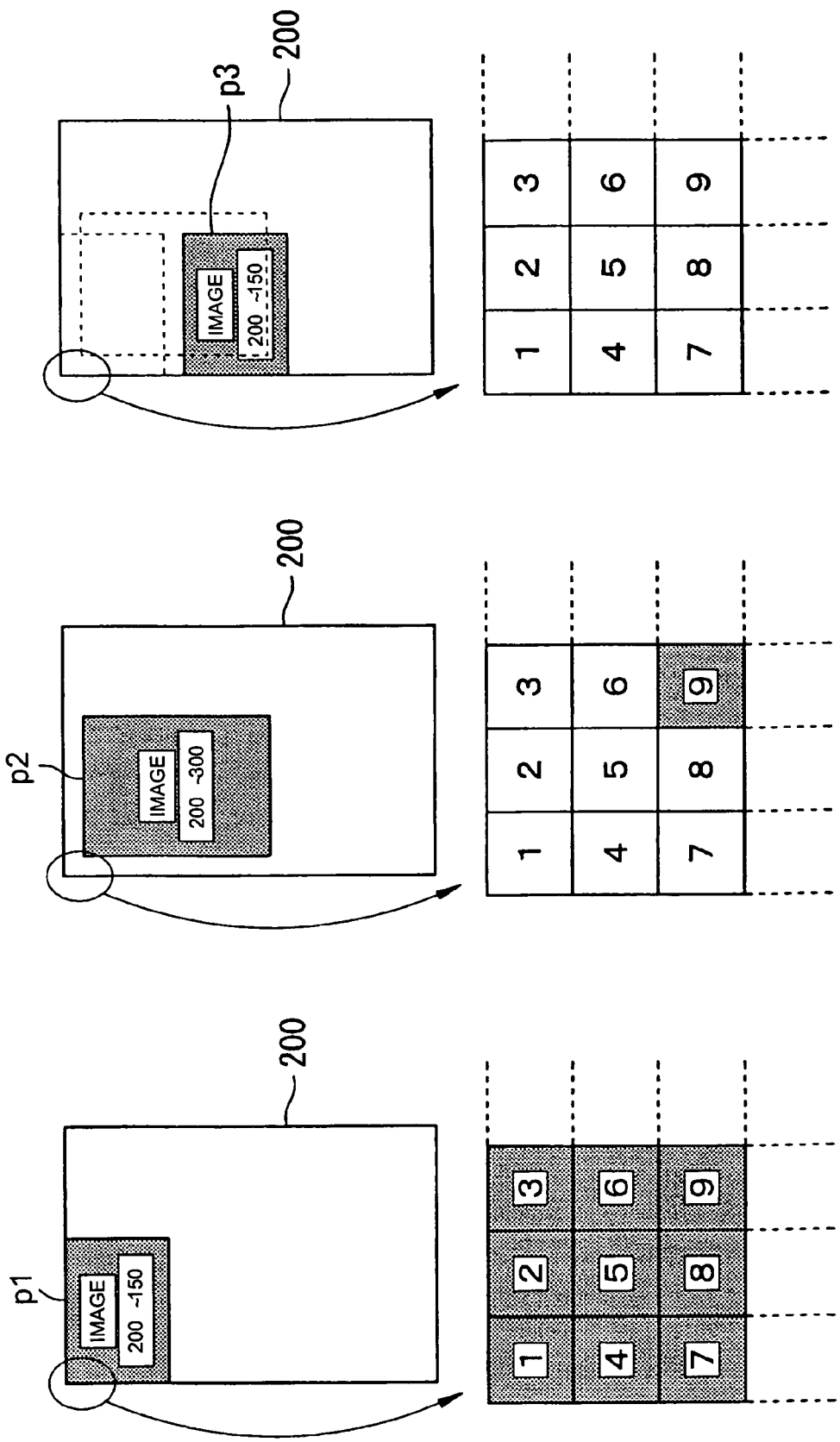
FIGS. 7A–7C are schematics, in a partially enlarged form, illustrating selected layout samples according to the second exemplary embodiment.

FIGS. 7A to 7C illustrate three layout samples including layout elements that are different in image information size or layout location. In the layout sample shown in FIG. 7A, image information "p1" with a size of "200 horizontal units×150 vertical units" is laid in the upper left corner of a layout frame 200. In the layout sample shown in FIG. 7B, image information "p2" with a size of "200 horizontal units×300 vertical units" is laid in a rectangular area slightly displaced down to the right from the upper left corner of the layout frame 200. In the layout sample shown in FIG. 7C, image information "p3" with a size of "200 horizontal units×150 vertical units" is laid on the left side of the layout frame 200, in a substantially vertically central rectangular area thereof.

In those samples, each layout sample is divided into units called cells arranged in the form of an array, as shown in enlarged schematics on the lower sides of FIGS. 7A to 7C. In the layout sample shown in FIG. 7A, image information "p1" is laid such that it extends down and to the right starting from a cell "1" located in the upper left corner of the layout frame 200. In the layout sample shown in FIG. 7B, image information "p2" is laid such that it extends down and to the right starting from a cell "9" slightly apart from the upper left corner of the layout frame 200. In the layout sample shown in FIG. 7C, image information "p3" is laid such that it extends down and to the right starting from a cell greatly apart downward from the upper left corner of the layout frame 200.

For each "cell", the mean distance between upper and lower edges, the mean distance between left and right edges of layout elements that contain the "cell" and the likelihood that the "cell" is occupied by any layout element are calculated and assigned to the "cell".

Specifically, when layout samples are given, the mean height and the mean width of all layout elements of the same type that contain a "cell" of interest are calculated, and the calculated values are assigned to that "cell". Furthermore, the total number of layout elements of the same type that contain that "cell" is divided by the total number of layout samples, and the resultant value is assigned as the likelihood to the "cell".

A specific example is shown in Table 1. As for a cell "1", the cell "1" is contained only in one piece of image information "p1" of three pieces of image information "p1", "p2", and "p3", and thus the likelihood that the cell "1" is contained in image information is given as "0.33 (=⅓)". The mean height and the mean width of image information to be assigned to the cell "1" are given by the mean height and the mean width of the image information "p1" directly containing the cell "1" and the image information "p2" having an overlap with the image information "p1", that is, the mean height is given as (150+300)/2 and the mean width is given as 200.

In the case of a cell "2", the cell "2" is contained only in one piece of image information "p1" of three pieces of image information "p1", "p2", and "p3", and thus the likelihood that the cell "2" is contained in image information is given as "0.33 (=⅓)". The mean height and the mean width of image information to be assigned to the cell "2" are also given by the mean height and the mean width of the image information "p1" directly containing the cell "2" and the image information "p2" having an overlap with the image information "p1", that is, the mean height is given as (150+300)/2 and the mean width is given as 200.

The likelihood that a cell is contained in image information and the mean height and width, are determined from one cell to another in the above described manner. Thus, the calculation for a cell "9" is described. In the case of the cell "9", as shown in FIG. 7B, the cell "9" is contained in two images "p1" and "p2" of the three images "p1", "p2", and "p3". Thus the likelihood that the cell "9" is contained in image information is given as "0.67 (=⅔)". The mean height and the mean width of image information to be assigned to the cell "9" are given by the mean height and the mean width of the image information "p1" and "p2" directly containing the cell "9" and the three image information "p1", "p2" and "p3" having an overlap with the image information "p2", that is, the mean height is given as (150+300+150)/3 and the mean width is given as 200.

The likelihood of being included in image information and the mean height and width are determined in a similar manner for all cells N or for cells until a particular cell.

TABLE 1

|   | VERTICAL | HORIZONTAL | PROBABILITY OF OCCURRENCE |
|---|---|---|---|
| 1 | (150 + 300)/2 | 200 | 0.33 |
| 2 | (150 + 300)/2 | 200 | 0.33 |
| ... | ... | ... | ... |
| 9 | (150 + 300 + 150)/3 | 200 | 0.67 |
| ... | ... | ... | ... |
| N | ... | ... | ... |

When a layout element is laid at a "cell" taken as an extension start point, an element-laying area for the layout element with a height and a width equal to the height and the width assigned to that "cell" is laid such that the upper left corner of the element-laying area is located at the "cell" (in the case in which the upper left corner of the element-laying area is selected as the extension start point). Furthermore, the likelihood that a cell is included in a layout element is added together for all cells included in the element-laying area. The above process is performed from one cell to another for all cells. For example, the process is performed from left to right and from top to bottom starting from the cell in the upper left corner. The location of the element-laying area that results in a greatest sum of likelihood is determined, and this location is employed as the location to place the element-laying area for the layout element.

For example, in the present example, one piece of image information with an undetermined size is placed in the layout frame 200 as follows. First, the cell "1" is selected as the extension start point. This cell "1" is assigned area-related parameters of "225 (vertical)×200 (horizontal)", and thus the sum of likelihood is calculated over all cells included in the area which has a size specified by the area-related parameters and which extends from an extension start point taken at the cell "1". After completion of determining the sum of likelihood of image information within the area with the size of "225 (vertical)×200 (horizontal)" extending from the extension start point taken at the cell "1", the sum of likelihood of all cells included in an area whose extension start point is located at a cell "2" is calculated. Furthermore, the calculation of the sum of likelihood is performed for areas whose extension start point is taken at cell "3", cell "4", and so on for all cells, and a cell resulting in a greatest sum is selected as the extension start point at which to place image information.

Thus, in the present exemplary embodiment, in addition to achieving advantages similar to those obtained in the first exemplary embodiment, it is possible to obtain well-balanced desirable layout even when sizes of layout elements are not fixed.

Although in the exemplary embodiment described above, the mean height and the mean width are assigned, as the element-laying area size, to each cell, the area and the aspect ratio maybe assigned as shown in Table 2. For example, image information "p1" has a size of 150 units in the vertical direction and 200 units in the horizontal direction, and image information "p2" has a size of 300 units in the vertical direction and 200 units in the horizontal direction. Thus the area of the image information "p1" is "30000" and the area of the image information "p2" is "60000". Thus, the mean area of image information is "45000 (=30000+60000)/2)".

On the other hand, the mean aspect ratio is given as (0.75 (=150/200 for p1)+1.5 (=300/200 for p2))/2.

In a case in which the aspect ratio of images is fixed in actual layout, only the mean value of areas may be used.

In a case in which a plurality of layout elements are laid, one of layout elements is first fixed in an upper left corner as in the case in which only one layout element is laid, and another layout element is placed to the first layout element, on the right, such that those two layout elements do not overlap with each other. Thereafter, the sum of likelihood is calculated over all areas of those two layout elements. The sum of likelihood is calculated while scanning all possible cells for the second layout element. After completion of scanning all possible cells for the second layout element, the extension start point of the first layout element is shifted to a cell on the right and the second layout element is placed to the first layout element, on the right. The sum of likelihood is calculated in a similar manner while scanning all possible cells for the second layout element. The calculation is performed until all cells for the first layout elements have been scanned and locations that result in a greatest sum of likelihood are employed.

For three or more layout elements, locations can be determined in a similar manner. However, in the case in which there are three or more layout elements, there is a possibility that it is impossible to place of all layout elements.

Although in the present exemplary embodiment, the upper left corner of a cell is employed as an extension start point at which the upper left corner of an area is placed, another point fixed in an area may be employed as the extension start point. For example, the barycenter, the upper right corner, the lower right corner, or the lower left corner may be employed.

TABLE 2

| AREA | | VERTICAL/ HORIZONTAL | PROBABIL- ITY OF OC- CURRENCE |
|---|---|---|---|
| 1 | (30000 + 60000)/2 | (0.75 + 1.5)/2 | 0.33 |
| 2 | (30000 + 60000)/2 | (0.75 + 1.5)/2 | 0.33 |
| . . . | . . . | . . . | . . . |
| 9 | (30000 + 60000 + 30000)/3 | (0.75 + 1.5 + 0.75)/3 | 0.67 |
| . . . | . . . | . . . | . . . |
| N | | | |

Figure 8:
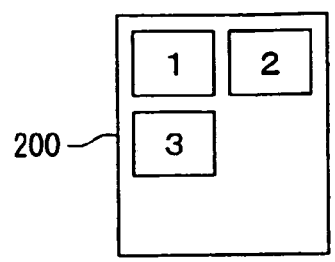
FIG. 8 is a schematic illustrating an example according to a third exemplary embodiment.
Figure 9:
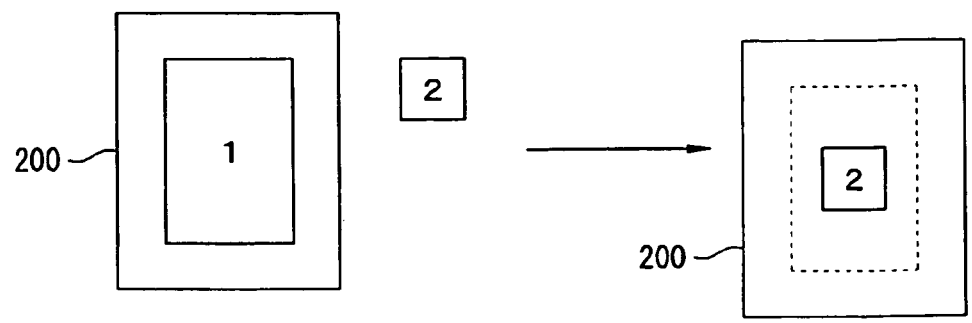
FIG. 9 is a schematic illustrating another example according to a third exemplary embodiment.
Figure 10:
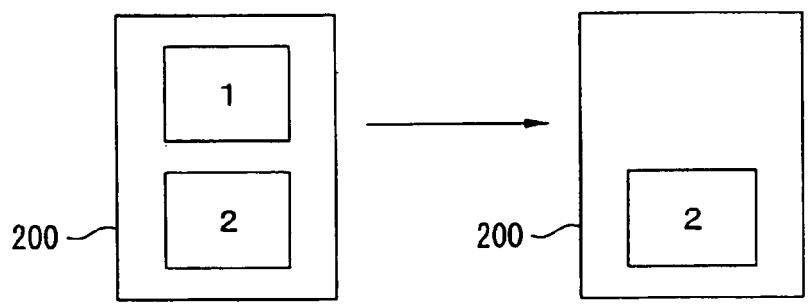
FIG. 10 is a schematic illustrating another example according to the third exemplary embodiment.

FIGS. 8 to 10 illustrate a third exemplary embodiment of the present invention. In this third exemplary embodiment, layout elements are laid in accordance with priority.

FIG. 8 illustrates a rule of laying a layout element when there are plural areas that are usable to lay the layout element and that are equal in likelihood.

For example, when available element-laying areas are located side by side, from left to right and from top to bottom in a layout frame 200, the priority is given in the order from left to right and from top to bottom. When the priority is given in the order from left to right and from top to bottom for the example shown in FIG. 8, element-laying areas "1" and "3" located on the left end are first selected, and then, of those two element-laying areas, the element-laying area "1", located at an upper position, is selected. In this specific example, the priority is given in the order "1"→"3"→"2", and a layout element is laid in accordance with this order.

On the other hand, in a case in which an available element-laying area "1" has a size greater than the size of an element-laying area "2" to be actually placed, the likelihood becomes equal for any location within the element-laying area "1". In such a case, the priority is assigned to upper, lower, left, and right locations, and also to the central location. In the example shown in FIG. 9, the center of the element-laying area "1" is assigned highest priority. Thus the element-laying area "2" is placed in the center of the element-laying area "1".

In the example shown in FIG. 10, an element-laying area, including a point having the highest likelihood, is assigned highest priority.

That is, when a plurality of employable element-laying areas are equal in sum of likelihood, an element-laying area including a point having highest likelihood is assigned the highest priority. In the specific example shown in FIG. 10, the element-laying area "2" includes a point having the highest likelihood, and thus the element-laying area "2" is assigned higher priority in selection than the element-laying area "1".

If the priority is assigned to respective element-laying areas or to respective locations, such as upper, lower, right, and left locations in an element-laying area in the above-described manner, layout elements can be laid in accordance with the priority even when the likelihood is equal. This makes it possible to reduce the likelihood or prevent two layout elements from being placed in the same element-laying area in a fully or partially overlapping manner. Thus, it is possible to achieve a proper layout.

Figure 11:
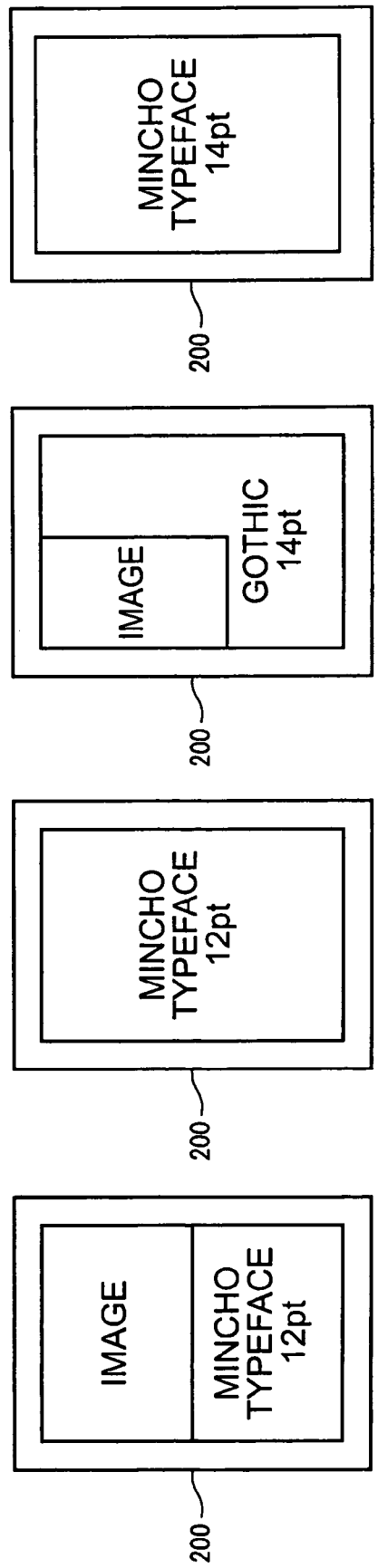
FIGS. 11A–11D are schematics illustrating selected layout samples according to a fourth exemplary embodiment.
Figure 12:
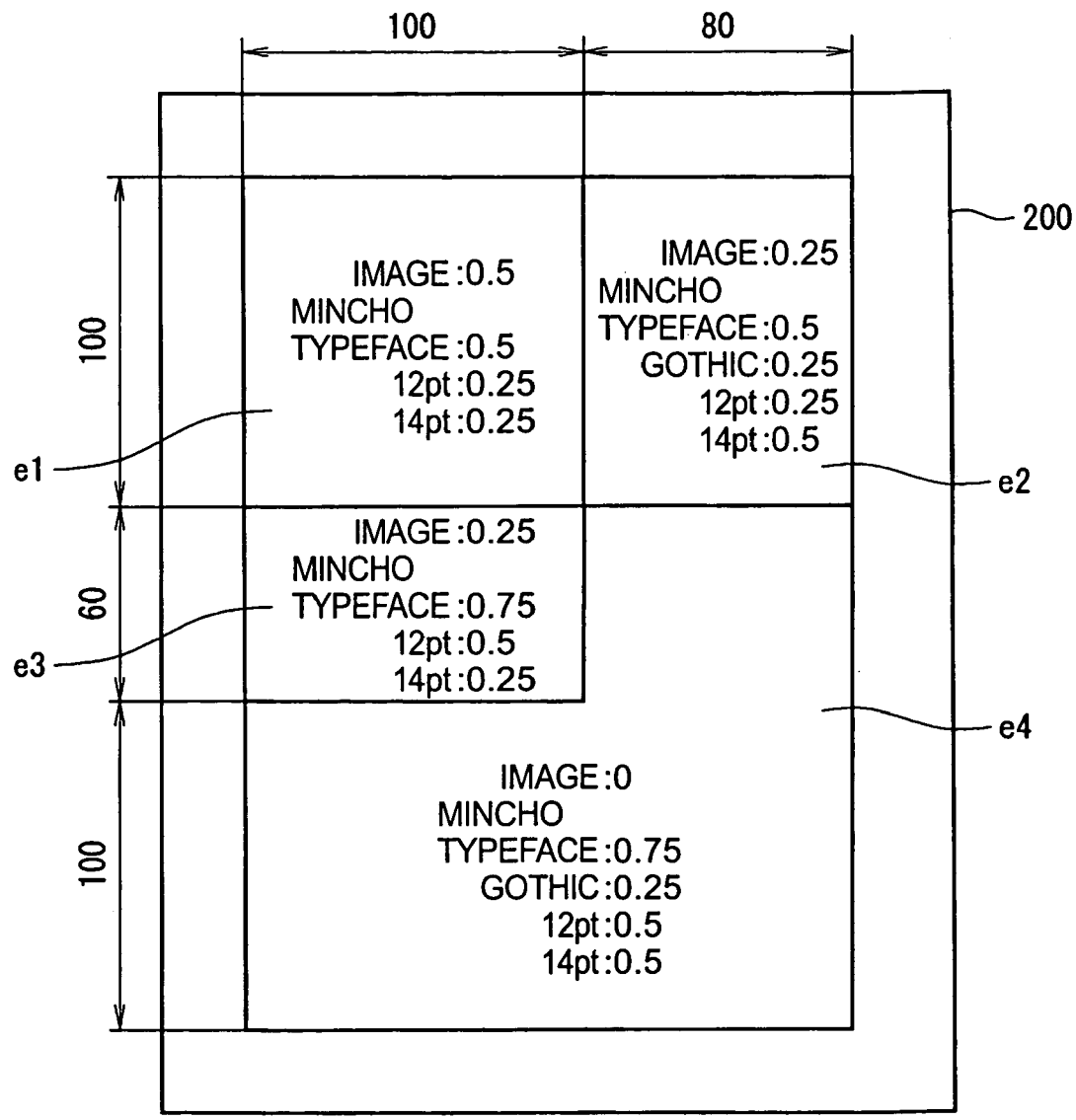
FIG. 12 is a schematic illustrating a template produced in accordance with the fourth exemplary embodiment.
Figure 13:
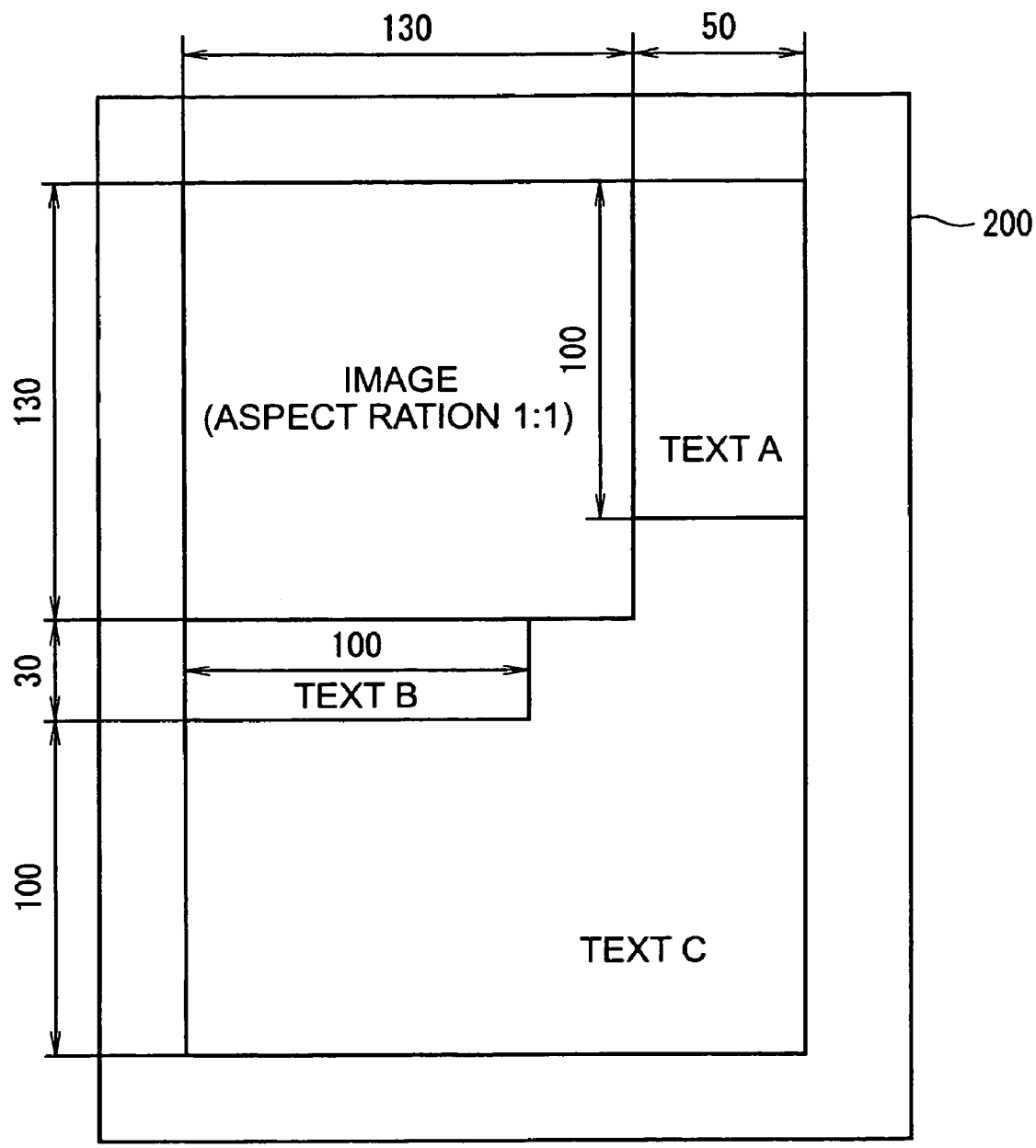
FIG. 13 is a schematic illustrating a layout employed in accordance with the fourth exemplary embodiment.

FIGS. 11 to 13 illustrate a fourth exemplary embodiment of the present invention. In this exemplary embodiment, in addition to the types of layout elements, such as image information and text information, which are dealt with in the previous exemplary embodiments, a font type and/or a font size of text information is also taken into account in the layout.

FIGS. 11A to 11D illustrate four layout samples in which element-laying areas of text information are defined, and font types and font sizes are assigned to the respective element-laying areas of text information. In an example shown in FIG. 11A, text information is placed in a lower area of a layout frame 200, and image information is laid in an upper area, wherein "Mincho typeface" is assigned as the font type and "12 p" is assigned as the font size to the text information. In an example shown in FIG. 11B, text information is laid over the entire layout frame 200, wherein "Mincho typeface" is assigned as the font type, and "12 p" is assigned as the font size to the text information.

In an example shown in FIG. 11C, image information is placed in an upper left area in the layout frame 200, and text information is laid in the remaining area, wherein "Gothic" is assigned as the font type, and "14 p" is assigned as the font size to the text information. In an example shown in FIG. 11D, text information is laid over the entire layout frame 200, wherein "Mincho typeface" is assigned as the font type, and "14 p" is assigned as the font size to the text information.

In the present exemplary embodiment, as in the first exemplary embodiment, the structure of each layout sample is first determined, and then a layout template in which likelihood of layout elements (image information and/or text information (font type, font size)) is registered is produced.

FIG. 12 shows an example of a layout template produced in the above-described manner. In this example, two pieces of image information (one of which is in a landscape-oriented rectangular area with a size of 100 in the vertical direction×180 in the horizontal direction and the other one of which is in a portrait-oriented rectangular area with a size of 160 in the vertical direction×100 in the horizontal direction) are placed such that they overlap in an upper left area of the layout frame 200, and text information is laid below those two pieces of image information.

In an area "e1" (100×100) in which the two pieces of image information overlap, the likelihood of each layout element is given as follows: layout element (image): 0.5 (=2/4), font type (Mincho typeface): 0.5 (=2/4), font size (12 p): 0.25 (=1/4), and font size (14 p): 0.25 (=1/4).

In an area "e2" (100×80) on the upper right side, the likelihood of each layout element is given as follows: image: 0.25 (=1/4), Mincho typeface: 0.5 (=2/4), Gothic: 0.25 (=1/4), 12 p: 0.25 (=1/4), and 14 p: 0.5 (=2/4).

In an area "e3" (60×100) in the vertical center on the left side, the likelihood of each layout element is given as follows: image: 0.25 (=1/4), Mincho typeface: 0.75 (=3/4), 12 p: 0.5 (=2/4), and 14 p: 0.25 (=1/4). In an area "e4"(the remaining area), the likelihood of each layout element is given as follows: image: 0.0 (=0/4), Mincho typeface: 0.75 (=3/4), Gothic: 0.25 (=1/4), 12 p: 0.5 (=2/4), and 14 p: 0.5 (=2/4).

For example, when one piece of image information is laid in an area and text information is laid in the remaining area by using the above-described template, if the image information to be laid has an aspect ratio of 1:1, the image size is determined by the mean area.

In the present example, as for areas for use by image information, the layout template includes only two partially overlapping areas, the extension start points of which are both located at the upper left corner. Thus, the area of image to be laid is given as (180 (horizontal)×100 (vertical) (horizontally-oriented rectangular image)+100 (horizontal)×160 (vertical) (vertically-oriented rectangular image))/2=17000

Because the image to be laid has the aspect ratio of 1:1, the height or width of the square image area becomes approximately equal to 130 (the square root of 17000), and image information is laid in an area at a location at which the sum of products of the likelihood and the area has a greatest value, as shown in FIG. 13.

After laying the image information in the above-described manner, as shown in FIG. 13, the remaining area is used as a text area in which fonts and font sizes are distributed as follows.

Text Area A

Mincho typeface: 0.5, Gothic: 0.25, 12 pt: 0.25, and 14 pt: 0.5

Text Area B

Mincho typeface: 0.75, Gothic: 0, 12 pt: 0.5, and 14 pt: 0.25

Text Area C

Mincho typeface: 0.75, Gothic: 0.25, 12 pt: 0.5, and 14 pt: 0.5

The area sizes of the respective areas are given as

Image information area: 130×130=16900

Text area A: 100×50=5000

Text area B: 30×100=3000

Text area C: 46800
(=180×260)−16900−5000−3000=21900

From the above, the format of the text area is determined as follows:

First, to determine whether to select the Mincho typeface or Gothic, the sum of the products of the likelihood and the area is calculated for each typeface as follows:

Mincho typeface:
0.5×5000+0.75×3000+0.75×21900=21175

Gothic 0.25×5000+0+0.25×21900=6725

From the above calculation result, the Mincho typeface is selected.

Similarly, the sum of the products of the likelihood and the area is calculated for each font size as follows:

12 pt: 0.25×5000+0.5×3000+0.5×21900=13700

14 pt: 0.5×5000+0.25×3000+0.5×21900=14200

From the above calculation result, 14 pt is selected.

In the present exemplary embodiment, as described above, not only the types of layout elements such as image information and text information, but also further detailed layout information, such as the font type and font size can be reflected in a new layout template. This makes it possible to obtain a desirable layout.

FIGS. 14 to 17 illustrate a layout system according to a fifth exemplary embodiment of the present invention.

Figure 14:
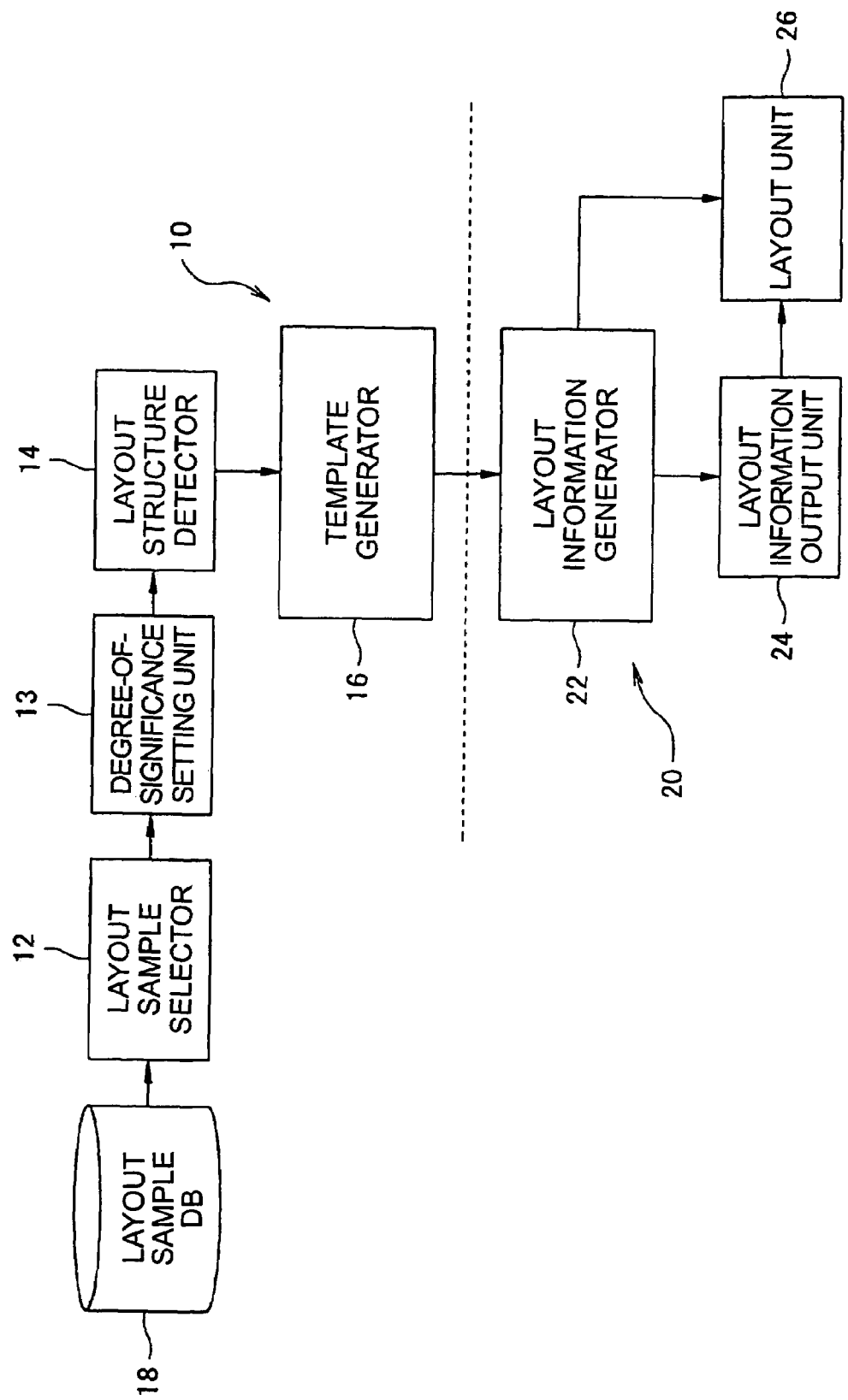
FIG. 14 is a block schematic illustrating a system structure according to a fifth exemplary embodiment.

In the first exemplary embodiment described earlier, as shown in FIG. 1, the layout system includes the template production device 10 and the layout device 20. As shown in FIG. 14, the layout system according to the fifth exemplary embodiment is similar to that according to the first exemplary embodiment except that the template production device 10 additionally includes a degree-of-significance setting unit 13 to setting the degree of significance to layout samples.

As will be described in further detail later, the degree-of-significance setting unit 13 provides a function to set the degree of significance to each of a plurality of layout samples selected by the layout sample selector 12. After the degree of significance are set arbitrarily to the layout samples by a user or a designer, information indicating the degree of significance is sent to the layout structure detector 14.

The layout device 20 to lay out layout elements using the layout template produced by the template production device 10 is similar in structure to that according to the first exemplary embodiment. The layout system according to the present exemplary embodiment may be realized by a computer system 100 similar to that according to the first exemplary embodiment.

Figure 15:
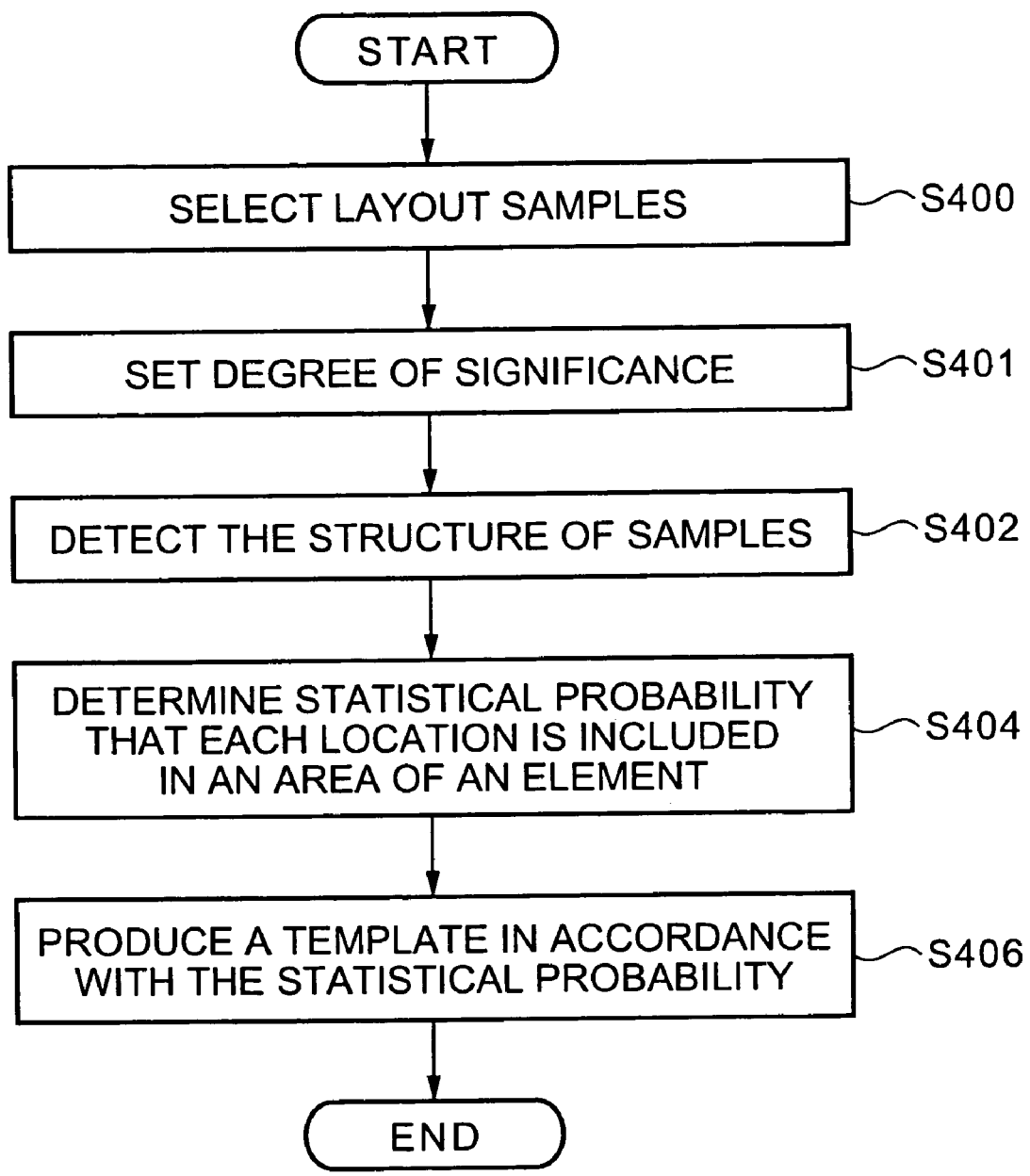
FIG. 15 is a flow chart illustrating a process of producing a template.

In the present exemplary embodiment, as shown in a flow chart of FIG. 15, in step S400, a plurality of layout samples are selected from the layout sample DB 18. Thereafter, in step S401, the degree of significance is set to each selected layout sample. In step S402, the layout structure of each layout element of each layout sample is detected. Thereafter, the process proceeds to step S404.

In step S404, in accordance with the setting made in step S401 and the determination made in step S402, the statistical probability of occurrence of each layout element at each location in the layout frame is determined.

More specifically, in step S404, a likelihood map corresponding to the layout frame is prepared as follows. Layout elements are selected from one layout element to another in a predetermined order from the selected layout samples. The likelihood that each selected layout element appears in an element-laying area is added together over the plural layout samples, and the resultant sum of the likelihood is described in an area, corresponding to the element-laying area of the layout element, in the likelihood map.

In step S404 described above, the calculation of the sum of the likelihood is performed in accordance with the degree of significance set in step S401.

If the likelihood that coordinates (x, y) of a layout sample k is occupied by an image is denoted by pk(x, y), and the degree of significance set to the coordinates (x, y) is denoted by wk(x, y), then the likelihood pT(x, y) that the coordinates (x, y) of the layout template are occupied by an image can be calculated in accordance with equation (1) shown below.

For usual layouts, pk(k, y) takes "1" or "0".

The degree of significance can be equal to "0" for particular coordinates, but the sum of the degree of significance (the denominator in equation (1)) must be greater than "0". When the degree of significance is equal to "0" for a particular layout sample, that layout sample is regarded as being not selected.

The above-described calculation is performed for all layout elements included in the selected layout samples. The sums of the likelihood calculated for all layout elements are employed as the sums of likelihood for the template to be produced.

Eq. 1
$$P_T(x, y) = \frac{\sum_k Wk(x, y)Pk(x, y)}{\sum_k Wk(x, y)} \quad (1)$$

FIG. 16 illustrates a manner in which a layout template is produced using three layout samples a, b, and c.

First, in steps S400 to S402, as described above, three layout samples a to c are selected from the layout sample DB 18. The degree of significance is set to each of the selected layout samples a to c, and the structure of each layout sample and layout elements included in each layout sample are detected.

In the layout sample a, one piece of image information "p1" is laid in a rectangular area in the upper left corner of a layout frame 200, text information "t1" is laid in the remaining area, and "5" is assigned as the degree of significance to the layout sample a. In the layout sample b, one piece of image information "p2" is laid in a rectangular area in the lower right corner of the layout frame 200, text information "t2" is laid in the remaining area, and "3" is assigned as the degree of significance. In the layout sample c, one piece of image information "p3" is laid in a rectangular area in the center the layout frame 200, and text information "t3" is laid around the image information "p3". 2" is assigned as the degree of significance to the layout sample c.

Thereafter, in step S404, layout elements are selected one by one in the predetermined order from each of the selected layout samples a, b, and c, and the sums of the likelihood of the respective selected layout elements are described in areas, corresponding to the element-laying areas of the selected layout elements, in the likelihood map.

The sums of likelihood are calculated in accordance with equation (1) taking into account the degree of significance assigned to the respective layout samples a, b, and c. More specifically, the likelihood of each selected layout element of each of the layout samples a, b, and c is weighted by a factor equal to the degree of significance, and the sums of the weighted likelihood is described in areas, corresponding to the element-laying areas of the respective layout elements, in the likelihood map.

Thereafter, in step S406, a layout template is produced in accordance with the statistical values described in the likelihood map.

Figures 16A, 16B, 16C:
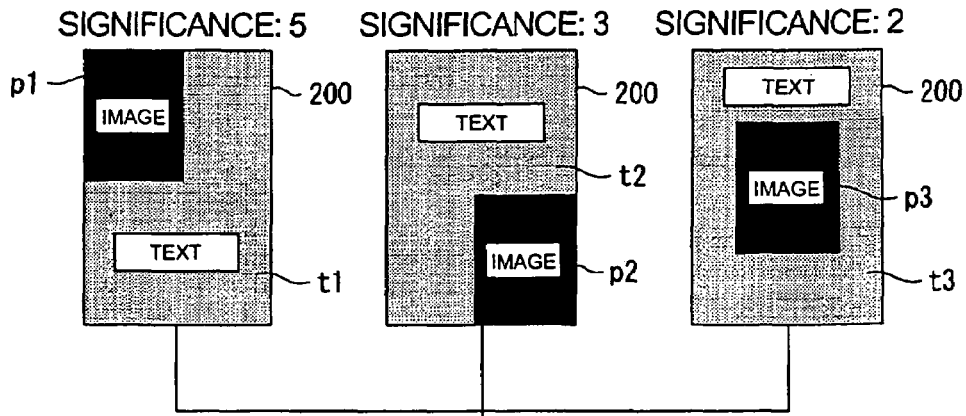
FIGS. 16A–16G are schematics illustrating a manner in which a layout template is produced using a plurality of layout samples.
Figures 16D, 16E:
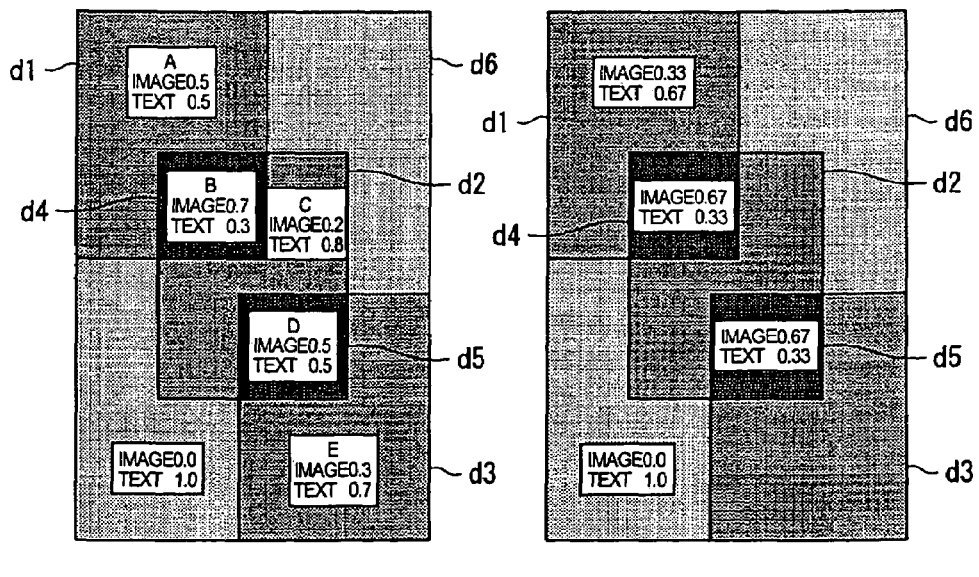

In the example shown in FIGS. 16A–16C from the three selected layout samples A, B, and C, a layout template is produced as shown in FIG. 16D.

In the layout template shown in FIG. 16D, text information is distributed over the entire layout frame 200, and image information is distributed only in a rectangular area "d1" in the upper left corner, a rectangular area "d3" in the lower right corner, and a rectangular area "d2" in the center of the layout frame 200.

The likelihood that image information appears in the layout frame 200 is calculated from equations (2) to (4) shown below as "0.5", "0.2", and "0.3" for the rectangular areas "d1", "d2", and "d3", respectively. On the other hand, the likelihood for areas "d4" and "d5", in which element-laying areas overlap, are calculated from equation (5) and (6) shown below as "0.7" and "0.5".

The likelihood that text information appears in the layout frame 200 is calculated as "0.5", "0.8", and "0.7" for the rectangular areas "d1", "d2", and "d3", respectively, 0.3" and "0.5" for the areas "d4" and "d5" in which element-laying areas overlap, and "1.0" for the remaining area "d6".

Eq. 2 AREA $d1$: $\frac{5 \times 1 + 3 \times 0 + 2 \times 0}{5 + 3 + 2} = 0.5$ (2)

Eq. 3 AREA $d2$: $\frac{5 \times 0 + 3 \times 0 + 2 \times 1}{5 + 3 + 2} = 0.2$ (3)

Eq. 4 AREA $d3$: $\frac{5 \times 0 + 3 \times 1 + 2 \times 0}{5 + 3 + 2} = 0.3$ (4)

Eq. 5 AREA $d4$: $\frac{5 \times 1 + 3 \times 0 + 2 \times 1}{5 + 3 + 2} = 0.7$ (5)

Eq. 6 AREA $d5$: $\frac{5 \times 0 + 3 \times 1 + 2 \times 1}{5 + 3 + 2} = 0.5$ (6)

Figures 16F, 16G:
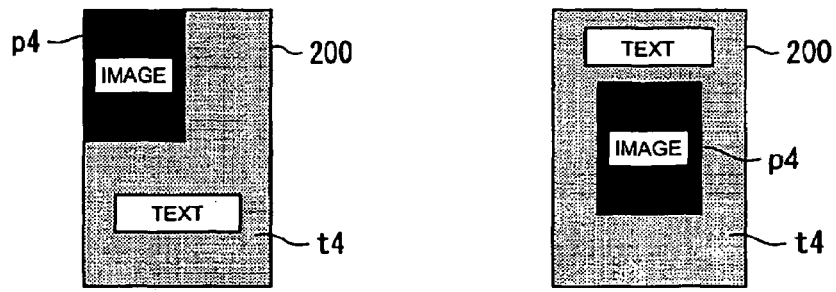

In a case in which the degree of significance is not taken into account in the calculation of the likelihood, a layout template, such as that shown in FIG. 16F is produced from the three selected layout samples A, B, and C, in a similar manner to the first exemplary embodiment.

In accordance with the layout template in which the distribution of the layout elements and the likelihood thereof are described, laying of layout elements is performed as follows. As shown in FIG. 16E, image information "p4" is laid in an area in the upper left corner of the layout frame 200, and text information "t4" is laid in the remaining area.

In the case in which the degree of significance is not taken into account in the calculation of the likelihood, laying out of layout elements is performed in a similar manner to the first exemplary embodiment such that, as shown in FIG. 16G, image information "p4" is laid in the center of the layout frame 200, and text information "t4" is laid in the remaining area.

By assigning the degree of significance to each layout sample and laying out layout elements in accordance with the layout template produced on the basis of the likelihood weighted by factors corresponding to the degree of significance as described above, it is possible to lay out elements in a manner desired by a user or a designer.

Weighting each layout sample causes all layout elements in the layout sample to be weighted by the same factor. This makes it easier to assign weighting factors to layout elements.

In the present exemplary embodiment, the degree of significance is assigned to each layout sample by the degree-of-significance setting unit 13 in the above-described manner. Note that the degree of significance is not necessarily needed to be given by a numerical value but may be given by identification information, such as a character or a symbol. In this case, it is necessary to convert the identification information into a numerical value.

In a case the degree of significance is given, for example, as "10%" and "30%", 10%" and "30%" are converted into numerical values "1" and "3" when a layout template is produced. In a case in which the degree of significance is given, for example, as "A", "B", and "C", A", "B", and "C" are converted into numerical values "3", "2", and "1" when a layout template is produced. In a case in which the degree of significance is given, for example, as "◎", "○", "Δ", and "×", "◎", "○", "Δ", and "×" are converted into numerical values "5", "3", "2", and "1" when a layout template is produced. Note that the manner of expressing the degree of significance is not limited to those described above.

Although in the present exemplary embodiment, the degree of significance is assigned to each layout sample by the degree-of-significance setting unit 13 in the above-described manner, the degree of significance may be assigned to an area in each layout sample, as shown in FIG. 17.

FIGS. 17A–17C illustrates an example of a manner in which a degree of significance is assigned not to a layout sample but to a particular specified area in the layout sample.

An example of the process of producing a layout template is described below for a case in which an area surrounded by a dotted circle in FIG. 17A is selected and "3" is assigned as the degree of significance to this selected area and "1" is assigned to the remaining area.

The values of the likelihood that an image is laid points in respective areas of a layout temple shown in FIG. 17C are calculated from equations (7) to (9) as "0.5", "0.25", and "0.75".

Eq. 7  AREA $F$: $\dfrac{1 \times 0 + 1 \times 1}{1 + 1} = 0.5$ (7)

Eq. 8  AREA $G$: $\dfrac{3 \times 0 + 1 \times 1}{3 + 1} = 0.25$ (8)

Eq. 9  AREA $H$: $\dfrac{3 \times 1 + 1 \times 0}{3 + 1} = 0.75$ (9)

In the exemplary embodiments described above, when the degree of significance is assigned to layout samples by the degree-of-significance setting unit 13, the number of times that each layout sample has been used to produce layout templates may be recorded, and the degree of significance may be assigned in accordance with the number of times.

For example, "2" is assigned as the degree of significance to layout samples that have been used 2 to 5 times, "3" to layout samples that have been used 5 to 10 times, and "4" to layout samples that have been used 10 or more times.

By employing the above scheme, it becomes possible for the system to automatically set the degree of significance to each layout sample. Alternatively, a user or a designer may manually set the degree of significance to each layout sample.

In the exemplary embodiments described above, when the degree of significance is assigned to layout samples by the degree-of-significance setting unit 13, layout samples may be selected by a user or a designer, and the degree-of-significance setting unit 13 may set the degree of significance in accordance with the selection made by the user or the designer.

For example, "5" is assigned as the degree of significance to a layout sample selected first, "4" to two layout samples selected thereafter, and "3" to another two layout samples selected thereafter. Similarly, "2" is assigned as the degree of significance to 6th and 10th layout samples, and "1" is assigned to any layout samples selected thereafter.

That is, the earlier a layout sample is selected by a user or a designer, a higher degree of significance is assigned to the layout sample. Alternatively, a user or a designer may specify the degree of significance for a part or whole of a selected layout sample.

In the exemplary embodiments described above, when the degree of significance is assigned to layout samples by the degree-of-significance setting unit 13, the degree of significance may be determined in accordance with the content or the genre of each layout sample.

For example, "3" is assigned as the degree of significance to layout samples including a sports article, and "1" to layout samples including a general article.

This makes it possible to lay out layout elements in a manner suitable for sports articles.

The rule of determining the degree of significance (the rule of which type content or genre is to be assigned a high degree of significance) may be selected by a user or a designer or may be determined depending on a selected layout element.

An aspect of the present invention is described in further detail below with reference to FIGS. 18 to 20.

Figure 18:
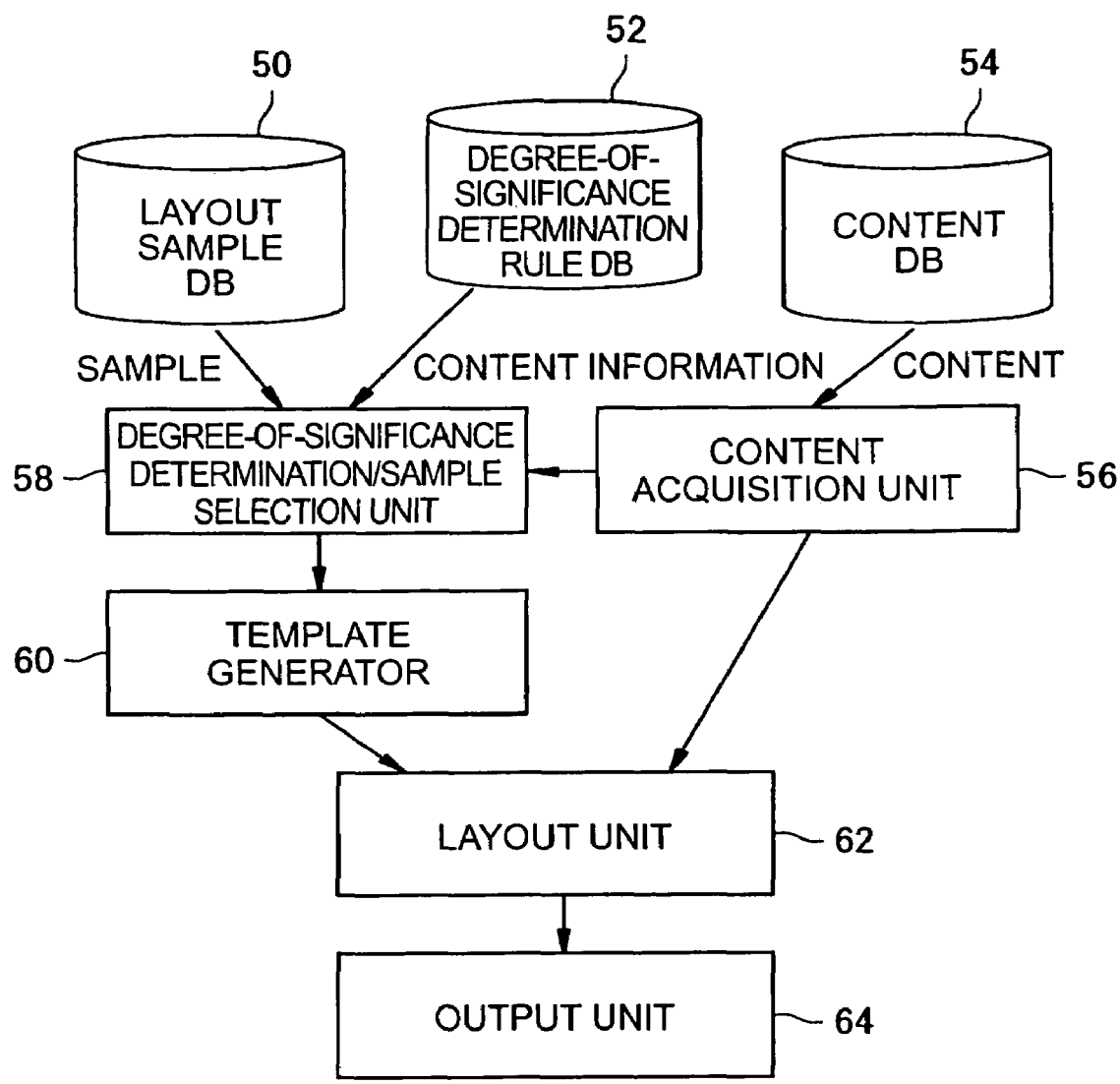
FIG. 18 is a block schematic illustrating the structure of another layout system according to an aspect of the present invention.

FIG. 18 is a block schematic illustrating another structure of a layout system according to the present invention.

As shown in FIG. 18, this layout system includes a layout sample DB 50 in which a plurality of layout samples are registered, a degree-of-significance determination rule DB 52 in which the rule of determining the degree of significance is registered, a content DB 54 in which a plurality of contents are registered as layout elements, a content acquisition unit 56, a degree-of-significance determination/sample selection unit 58, a template generator 60, a layout unit 62, and an output unit 64.

The content acquisition unit 56 acquires a content from the content DB 54.

The degree-of-significance determination/sample selection unit 58 selects a plurality of layout samples from those registered in the layout sample DB 50 and determines the degree of significance to be assigned to each selected layout sample in accordance with the degree-of-significance determination rule defined in the degree-of-significance determination rule DB 52. When some layout elements included in the selected layout samples are equal or similar to the selected content, the values of the likelihood of those layout elements in the layout samples are weighted by a factor corresponding to the degree of significance.

The template generator 60 and the layout unit 62 function in similar manners to the template generator 16 and the layout unit 26, respectively. The output unit 64 outputs the layout produced by the layout unit 62 to the display 42.

In the degree-of-significance determination rule DB 52 includes data indicating the degree-of-significance determination rule, wherein the data has a data structure such as that shown in FIG. 19.

FIG. 19 is a schematic illustrating the data structure of the data indicating the degree-of-significance determination rule.

As shown in FIG. 19, the degree-of-significance determination rule is described in XML (eXtensible Markup Language). In the specific example shown in FIG. 19, the degree-of-significance determination rule is defined for a case in which the content genre is soccer. Specifically, the degree of significance is defined for each genre of a layout sample and for each keyword included in a layout sample.

In a case in which two or more rules are applied, a rule having higher degree of significance is assigned higher priority.

Figure 20:
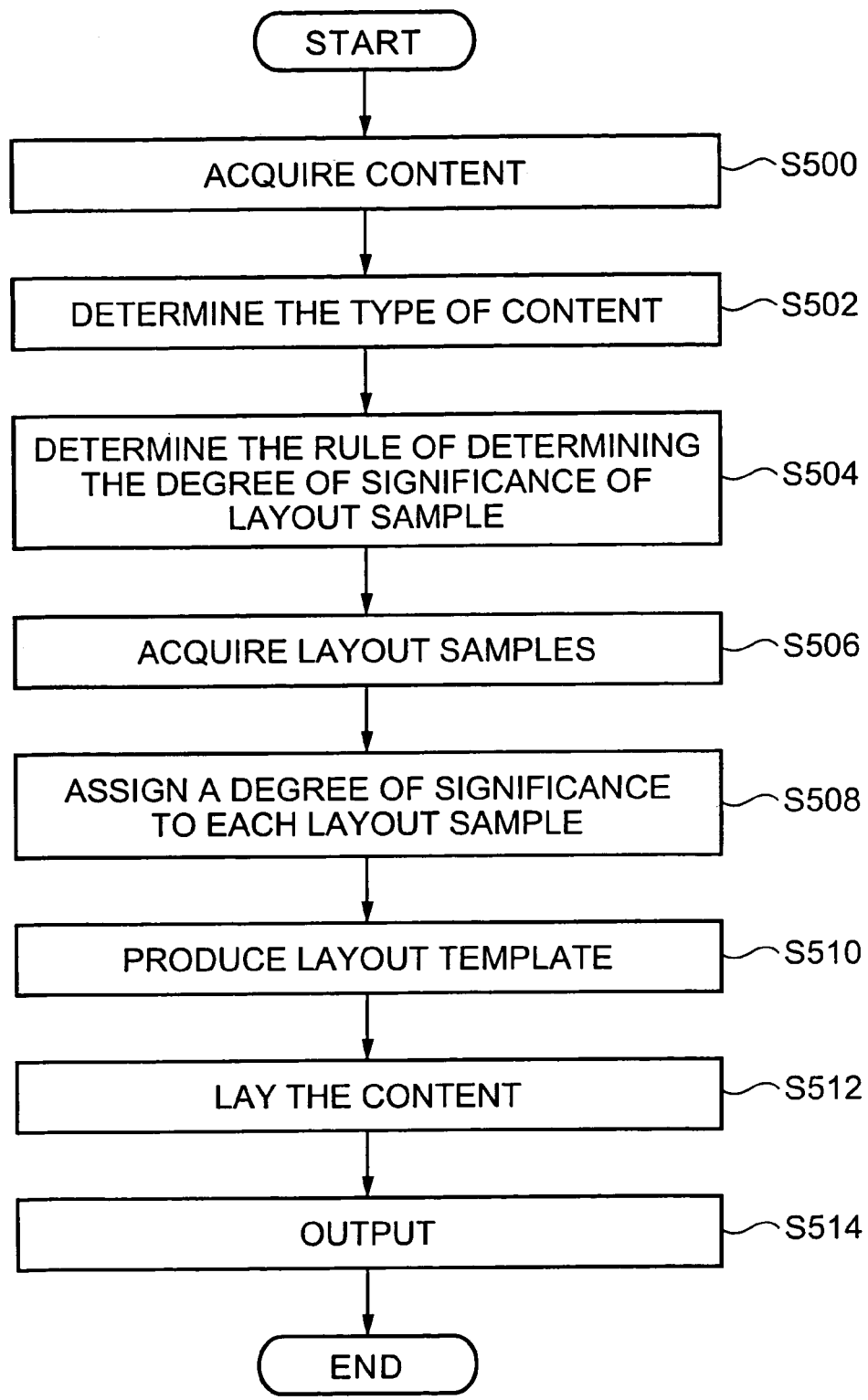
FIG. 20 is a flow chart illustrating a layout process.

The CPU 30 performs a layout process according to a flow chart shown in FIG. 20, instead of the flow charts shown in FIGS. 15 and 5.

FIG. 20 is a flow chart showing the layout process.

The layout process is realized by the CPU 30 as the content acquisition unit 56, the degree-of-significance determination/sample selection unit 58, the template generator 60, the layout unit 62, and the output unit 64. As shown in FIG. 20, the layout process is executed by the CPU 30 starting from step S500.

In step S500, a content is selected from the content DB 54. In the next step S502, the genre of the selected content is determined. Thereafter, the process proceeds to step S504.

In step S504, the degree of significance to be applied to each selected layout sample is determined in accordance with the degree-of-significance determination rule defined in the degree-of-significance determination rule DB 52. For example, when the genre of the content is soccer, the degree of significance is set to "5". If the genre of the content is a sport other than soccer, the degree of significance is set to "3". When the genre of the content is neither soccer nor any other sport, but a particular related keyword is included, the degree of significance is set to "2". Examples of such keywords include player names and team names. If a particular layout is specified as a favorite layout by a user, a high degree of significance may be assigned regardless of genres.

Thereafter, in step S506, a plurality of layout samples are selected from the layout sample DB 50. In step S508, if some layout elements included in the selected layout samples are equal or similar to the selected content, the values of the likelihood of those layout elements in the layout samples are weighted by a factor corresponding to the degree of significance. Thereafter, the process proceeds to step S510.

In step S510, a layout template is produced in a similar manner as in steps S404 and S406. Thereafter, in step S512, the content is laid out in a similar manner as in steps S410 to S414. If the resultant layout is then output in step S514, the layout process is completed.

In this layout process, as described above, when a layout template is produced, weighting is performed depending on a selected content, and thus it is possible to obtain a layout suitable for the selected content.

Although in the exemplary embodiments described above, text information and image information are used as layout elements, the layout elements are not limited to those. For example, moving image information, audio information or another type of multimedia data may be employed as a layout element.

In the exemplary embodiments described above, the process shown in the flow chart of FIGS. 15, 5, or 20 is executed in accordance with the control program preinstalled in the ROM 32, the manner of executing the process is not limited to that. For example, a program may be read into the RAM 34 from a storage medium on which the program is stored, and the program stored in the RAM may be executed.

Any computer-readable storage medium may be employed for the above purpose, regardless of the type thereof and regardless of the manner of reading data from the storage medium. Specific examples include a semiconductor storage medium, such as a RAM and a ROM, a magnetic storage medium, such as a FD and a HD, an optical storage medium, such as a CD, a CDV, a LD, and DVD, and a magnetooptical storage medium, such as a MO.

In the exemplary embodiments described above, the template production system, the layout system, the template production program, the layout program, the layout template data structure, the template generation method, and the layout method according to an aspect of the present invention are applied to the production of a layout template using a plurality of layout samples and the layout process using the produced layout template. Note that the present invention may also be used in other applications without departing from the spirit and scope of the invention.

What is claimed is:

1. A computer-readable media causing a computer processor to operate a layout system, comprising:

a template production function that determines a structure of a plurality of layout samples, each of the plurality of layout samples including at least one layout element laid in a layout frame, and that produces a layout template by combining selected layout samples and having a layout position for the at least one layout element, and having a layout likelihood for an element-laying area that is based on a statistical probability and that corresponds to a position of the at least one layout element in the layout samples combined to produce the layout template; and a layout function that generates a new layout having at least one new layout element in a template layout frame in accordance with the layout template produced by the template production function, wherein the layout function generates the at least one new layout element by performing a process including dividing the layout template into a plurality of cells; calculating, for each cell, mean values of vertical and horizontal lengths of each layout element that contains the cell and the layout likelihood of each layout element; calculating a sum of the layout likelihood of all cells included in an element-laying area placed so as to extend, from a cell taken as an extension start point, in a vertical direction by a length equal to the calculated mean vertical length and in a horizontal direction by a length equal to the calculated mean horizontal length, for each possible location of the extension start point; and selecting an extension start point that results in a greatest sum of the layout likelihood and laying a corresponding new layout element in the element-laying area extending from the selected extension start point.

2. The computer-readable media according to claim 1, wherein the layout function employs an area calculated in units squared or an aspect ratio of each layout element instead of or in addition to the mean values, assigned to each cell, of vertical and horizontal lengths of each layout element.

3. The computer-readable media according to claim 1, wherein the at least one layout element is classified into image information with a main part that is an image and into text information with a main part that is text;

when the template production function sets the layout position and the layout likelihood of a layout element having text information, the template production function also sets information indicating a font type and a font size of the text information; and when the layout function lays the layout element having text information in a particular element-laying area, the layout function determines a font type and a font size of the layout element in accordance with information indicating a font type and a font size assigned to the particular element-laying area.

4. The computer-readable media according to claim 1, wherein the layout element of each of the plurality of layout samples is assigned a significance weighing factor, the layout likelihood being a weighed layout likelihood corresponding to the significance weighing factors for the layout elements combined to produce the layout template.

5. A computer-readable media according to claim 1, wherein a significance weighing factor is assigned to each layout sample as a whole, the layout likelihood being a weighed layout likelihood corresponding to the significance weighing factors for the layout samples combined to produce the layout template.

6. The computer-readable media according to claim 1, wherein for an element-laying area that corresponds to at least two layout elements that overlap each other, the template production function calculates the sums of the layout likelihood of the at least two layout elements and provides, in the layout template, the calculated sums of the layout likelihood corresponding to the element-laying area.

7. A layout method, comprising:

determining the structure of a plurality of layout samples, each of the plurality of layout samples including at least one layout element laid in a layout frame, for each layout element;

producing a layout template by combining selected layout samples in which a layout position of each layout element in the layout frame is identified as corresponding to a layout likelihood that is based on a statistical probability; and laying at least one new layout element in a new layout frame in accordance with the produced layout template, wherein the laying generates the at least one new layout element by performing a process including dividing the layout template into a plurality of cells; calculating, for each cell, mean values of vertical and horizontal lengths of each layout element that contains the cell and the layout likelihood of each layout element; calculating a sum of the layout likelihood of all cells included in an element-laying area placed so as to extend, from a cell taken as an extension start point, in a vertical direction by a length equal to the calculated mean vertical length and in a horizontal direction by a length equal to the calculated mean horizontal length, for each possible location of the extension start point; and selecting an extension start point that results in a greatest sum of the layout likelihood and laying a corresponding new layout element in the element-laying area extending from the selected extension start point.

* * * * *